US012593086B2

(12) United States Patent  
Miyamoto et al.

(10) Patent No.: US 12,593,086 B2  
(45) Date of Patent: Mar. 31, 2026

(54) SERVER, INFORMATION PROCESSING SYSTEM, STORAGE MEDIUM, AND TRANSMISSION METHOD

(71) Applicant: Nintendo Co., Ltd., Kyoto (JP)

(72) Inventors: Shigeru Miyamoto, Kyoto (JP); Takeshi Ito, Kyoto (JP); Norio Asakura, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 690 days.

(21) Appl. No.: 18/113,303

(22) Filed: Feb. 23, 2023

(65) Prior Publication Data

US 2023/0276085 A1     Aug. 31, 2023

(30) Foreign Application Priority Data

Feb. 28, 2022     (JP) ................................. 2022-029609

(51) Int. Cl.
| | |
|---|---|
| *H04N 21/235* | (2011.01) |
| *H04N 21/232* | (2011.01) |
| *H04N 21/258* | (2011.01) |
| *H04N 21/84* | (2011.01) |

(52) U.S. Cl.
CPC ....... *H04N 21/2353* (2013.01); *H04N 21/232* (2013.01); *H04N 21/25866* (2013.01); *H04N 21/84* (2013.01)

(58) Field of Classification Search
CPC ............. H04N 21/2353; H04N 21/232; H04N 21/25866; H04N 21/84; H04N 21/2668; H04N 21/44222; H04N 21/6582; H04N 21/25891; H04N 21/4532; H04N 21/8133; H04N 21/8549
See application file for complete search history.

(56) References Cited

U.S. PATENT DOCUMENTS

| | | | | |
|---|---|---|---|---|
| 9,374,610 | B1 * | 6/2016 | Chang | H04N 21/6125 |
| 10,555,023 | B1 * | 2/2020 | McCarthy | H04N 21/8549 |
| 10,917,703 | B2 * | 2/2021 | Aher | G11B 27/034 |
| 12,464,206 | B1 * | 11/2025 | Agrawal | H04N 21/47217 |

(Continued)

FOREIGN PATENT DOCUMENTS

| | | |
|---|---|---|
| JP | 2009-278342 | 11/2009 |
| JP | 2011-124656 | 6/2011 |

(Continued)

*Primary Examiner* — Kunal Langhnoja  
(74) *Attorney, Agent, or Firm* — Nixon & Vanderhye PC

(57) ABSTRACT

An example of a storage medium accessible by a server stores a plurality of video content items that are assigned sequential numbers. The storage medium stores premise information, which is information related to another video content item of the plurality of video content items other than the at least one video content item. The storage medium stores history information. The server receives, from the terminal, information that indicates a specified video content item that is specified by the user from among the plurality of video content items. Based on the premise information associated with the specified video content item and the history information of the user, the server generates an additional content item that describes the other video content item corresponding to the premise information. The server transmits the specified video content item and the additional content item to the terminal.

20 Claims, 11 Drawing Sheets

(56) References Cited

U.S. PATENT DOCUMENTS

| | | | |
|---|---|---|---|
| 2009/0158350 A1* | 6/2009 | DeCamp ............ | H04N 21/8549 |
| | | | 725/58 |
| 2009/0249397 A1* | 10/2009 | Bhogal ................ | H04N 21/458 |
| | | | 725/40 |
| 2009/0285550 A1 | 11/2009 | Yamada et al. | |
| 2013/0254308 A1* | 9/2013 | Rose ................ | H04N 21/26258 |
| | | | 709/206 |
| 2015/0382052 A1* | 12/2015 | Pearlman ......... | H04N 21/44226 |
| | | | 725/46 |
| 2017/0280208 A1* | 9/2017 | Mishra .................... | G06F 18/29 |
| 2017/0310723 A1* | 10/2017 | Furtwangler ......... | H04L 65/762 |
| 2018/0152758 A1* | 5/2018 | Miller ................... | G06F 16/735 |
| 2020/0304863 A1* | 9/2020 | Domm ................... | H04L 67/55 |
| 2023/0214461 A1* | 7/2023 | Brooks .................. | G06F 21/16 |
| | | | 705/27.1 |

FOREIGN PATENT DOCUMENTS

| | | |
|---|---|---|
| JP | 2013-016962 | 1/2013 |
| JP | 2015-019217 | 1/2015 |

* cited by examiner

Fig.11

SERVER, INFORMATION PROCESSING SYSTEM, STORAGE MEDIUM, AND TRANSMISSION METHOD

CROSS REFERENCE TO RELATED APPLICATION

This application claims priority to Japanese Patent Application No. 2022-29609, filed on Feb. 28, 2022, the entire contents of which are incorporated herein by reference.

FIELD

The present disclosure relates to a server, an information processing system, a storage medium, and a transmission method for transmitting video content items to terminals.

BACKGROUND AND SUMMARY

There are conventional systems for transmitting video content items to terminals.

Where there are a plurality of video content items to be provided to users of terminals and these video content items are related to each other in terms of the contents thereof, if the user has not viewed one video content item, it may be difficult for the user to fully understand the contents when viewing other video content items.

Therefore, the present application discloses a server, an information processing system, a storage medium, and a transmission method which can make it easier for a user to understand video content items.

(1)

An example of a server is for transmitting a video content item to a terminal used by a user. A storage medium accessible by the server is configured to: store a plurality of video content items that are assigned sequential numbers; store premise information, which is information that is associated with at least one video content item from among the plurality of video content items and is information related to another video content item of the plurality of video content items other than the at least one video content item; and store history information that indicates viewing history of the user for the plurality of video content items. The server includes a processor and a memory coupled thereto, the processor being configured to control the server to at least: receive, from the terminal, information that indicates a specified video content item that is specified by the user from among the plurality of video content items; based on the premise information associated with the specified video content item and the history information of the user, generate an additional content item that describes the other video content item corresponding to the premise information; and transmit the specified video content item and the additional content item to the terminal.

With configuration (1) above, an additional content item that describes the contents of other video content items that are different from the specified video content item is transmitted to the terminal in addition to the specified video content item. This can make it easier for the user to understand the transmitted video content item.

(2)

The specified video content item and the additional content item may be transmitted to the terminal so that the additional content item is output before the specified video content item on the terminal.

With configuration (2) above, it is possible to make it more likely that the user views the additional content item before viewing the specified video content item.

(3)

The premise information associated with the video content item may be information related to the other video content item whose sequential number is before the video content item from among the plurality of video content items.

With configuration (3) above, this can make it easier for the user to understand the specified video content item even if the user has not viewed other video content items whose sequential numbers are before the specified video content item.

(4)

If the history information indicates that the other video content item corresponding to the premise information associated with the specified video content item is un-viewed, the additional content item may be generated so as to include contents of a part of the other video content item corresponding to the premise information.

With configuration (4) above, it is possible to generate an additional content item that is effective for the understanding of the specified video content item.

(5)

The premise information may be information with which it is possible to identify a description content item that describes the other video content item. The additional content item may include a description content item that is identified by the premise information associated with the specified video content item and that is related to the video content item indicated as being un-viewed in the history information.

With configuration (5) above, it is possible to generate an additional content item that is effective for the understanding of the specified video content item.

(6)

The history information may further indicate a viewing history of the user for the description content item. When the user views the additional content item, the history information may be updated so as to indicate that the description content item included in the additional content item has been viewed. If the history information indicates that the description content item identified by the premise information associated with the specified video content item has been viewed for a number of times that is equal to or greater than a predetermined number of times, the additional content item may be generated without including the description content item.

With configuration (6) above, it is possible to generate additional content items that include more useful information for the user.

(7)

An upper limit may be set for a length of the additional content item. If a total length of one or more description content items that are identified by the premise information associated with the specified video content item and that are related to video content items indicated as un-viewed in the history information exceeds the upper limit, the additional content item may be generated using an abbreviated version of a description content item for at least some of the one or more description content items so that the total length is less than or equal to the upper limit.

With configuration (7) above, it is possible to prevent the length of the additional content item from becoming too long.

3

(8)

An upper limit may be set for a length of the additional content item. Priorities may be set for the description content items. If a total length of one or more description content items that are identified by the premise information associated with the specified video content item and that correspond to video content items that are indicated as un-viewed in the history information exceeds the upper limit, the description content item to be included in the additional content item may be determined based on the priorities set for the one or more description content items so that the total length is less than or equal to the upper limit.

With configuration (8) above, it is possible to prevent the length of the additional content item from becoming too long.

(9)

The storage medium may store digest information indicating a digest version content item of a video content item for each of the plurality of video content items. The additional content item including the digest version content item may be generated based further on the digest information corresponding to other video content items whose sequential numbers are before the specified video content item from among the plurality of video content items.

With configuration (9) above, it is possible to generate an additional content item that is more useful for the user.

(10)

Priorities may be set for the digest version content items. The digest version content item to be included in the additional content item may be determined based on the priorities set for the digest version content items.

With configuration (10) above, it is easier to generate an additional content item that is useful for the user.

(11)

The additional content item may be generated (a) without including the digest version content items that correspond to video content items indicated as un-viewed in the history information, or (b) without including digest version content items that correspond to video content items indicated as un-viewed in the history information and that are indicated by the digest information to which predetermined specification information is attached.

With configuration (11) above, it is possible to reduce the possibility that the user is informed more than necessary of the contents of the video content item that the user has not viewed.

(12)

An upper limit may be set for a length of the additional content item. If a length of the additional content item including one or more digest version content items selected based on a predetermined criterion from among digest version content items corresponding to the plurality of video content items exceeds the upper limit, the additional content item may be generated using an abbreviated version of a content item for at least one of the one or more digest version content items so that the length is less than or equal to the upper limit.

With configuration (12) above, it is possible to prevent the length of the additional content item from becoming too long.

(13)

A lower limit may be set for a length of the additional content item. If a length of the additional content item based on the premise information associated with the specified video content item and the history information is less than the lower limit, the additional content item including the digest version content item may be generated so that the length is equal to or greater than the lower limit.

With configuration (13) above, it is possible to prevent the length of the additional content item from becoming too short.

(14)

When the specified video content item is a video content item whose sequential number is first, the specified video content item may be transmitted to the terminal without generating the additional content item.

With configuration (14) above, it is possible to reduce the processing load of the server and reduce the amount of communication traffic.

Note that the present specification discloses an example of an information processing system for executing the processes of configurations (1) to (14) above. The present specification also discloses an example of a storage medium storing an information processing program (e.g., a server program) that causes a computer to execute all or some of the processes of configurations (1) to (14) above. The present specification also discloses an example of a transmission method by which the processes of configurations (1) to (14) above are executed on the server or the information processing system.

With the server, the information processing system, the storage medium and the transmission method described above, it is possible to make it easier for the user to understand video content items.

These and other objects, features, aspects and advantages of the present invention will become more apparent from the following detailed description of the present invention when taken in conjunction with the accompanying drawings.

BRIEF DESCRIPTION OF THE DRAWINGS

FIG. 11 is a flowchart showing an example of a flow of a viewing determination process to be executed by a non-limiting server.

DETAILED DESCRIPTION OF NON-LIMITING EXAMPLE EMBODIMENTS

[1. Configuration of Information Processing System]

Figure 1:
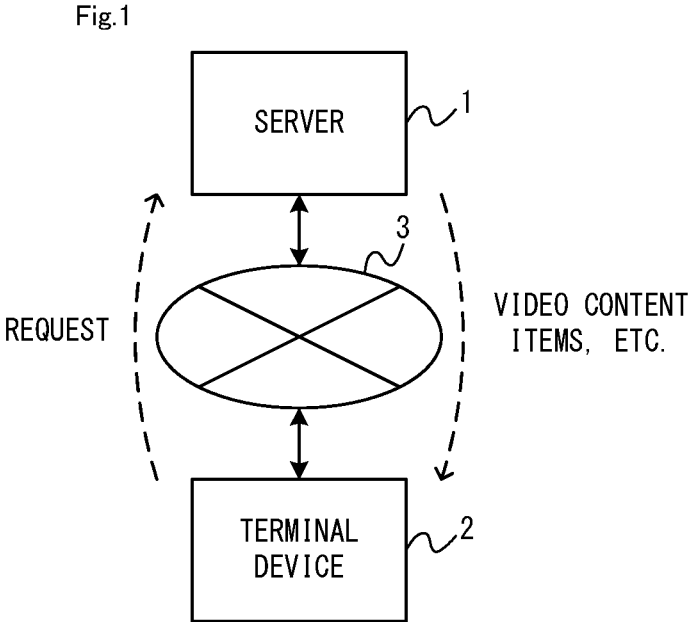
FIG. 1 is a block diagram showing an example of a configuration of a non-limiting information processing system of the present embodiment.

Hereinafter, an information processing system, an information processing program, and an information processing method according to the present embodiment will be described. Firstly, description will be given of the overall configuration of the information processing system and the configurations of the terminal apparatus and a server included in the information processing system according to the present embodiment. FIG. 1 is a block diagram showing an example of the configuration of the information processing system according to the present embodiment. As shown in FIG. 1, the information processing system includes a server 1 and a terminal apparatus 2. The server 1 and the terminal apparatus 2 are connectable to a network 3, such as the Internet and/or a mobile communication network. The server 1 and the terminal apparatus 2 are communicable with each other via the network 3.

The server 1 is a server for providing services related to an application executed on the terminal apparatus 2 (specifically, an application for the user of the terminal apparatus 2 to view video content items). In the present embodiment, the server 1 is a server for transmitting (or "distributing") video to be viewed on one or more the terminal apparatuses 2. For example, the server 1 transmits a video content item to the terminal apparatus 2 in response to a request from the terminal apparatus 2, and the terminal apparatus 2 plays the video content item transmitted from the server 1 using a predetermined application (see FIG. 1). Note that while it is assumed in FIG. 1 that there is one the terminal apparatus 2 included in the information processing system, the information processing system may include a plurality of the terminal apparatuses, and the server 1 may transmit video content items to the terminal apparatuses in response to requests from the terminal apparatuses.

The terminal apparatus 2 is an example of an information processing apparatus possessed by a user. Examples of the terminal apparatus 2 include a smart phone, a hand-held or stationary game apparatus, a mobile phone, a tablet terminal, a personal computer, and a wearable terminal. The terminal apparatus 2 is capable of executing the application (in other words, a program) for playing a video content item provided by the server 1.

(Specific Example of Configuration of Server 1)

Figure 2:
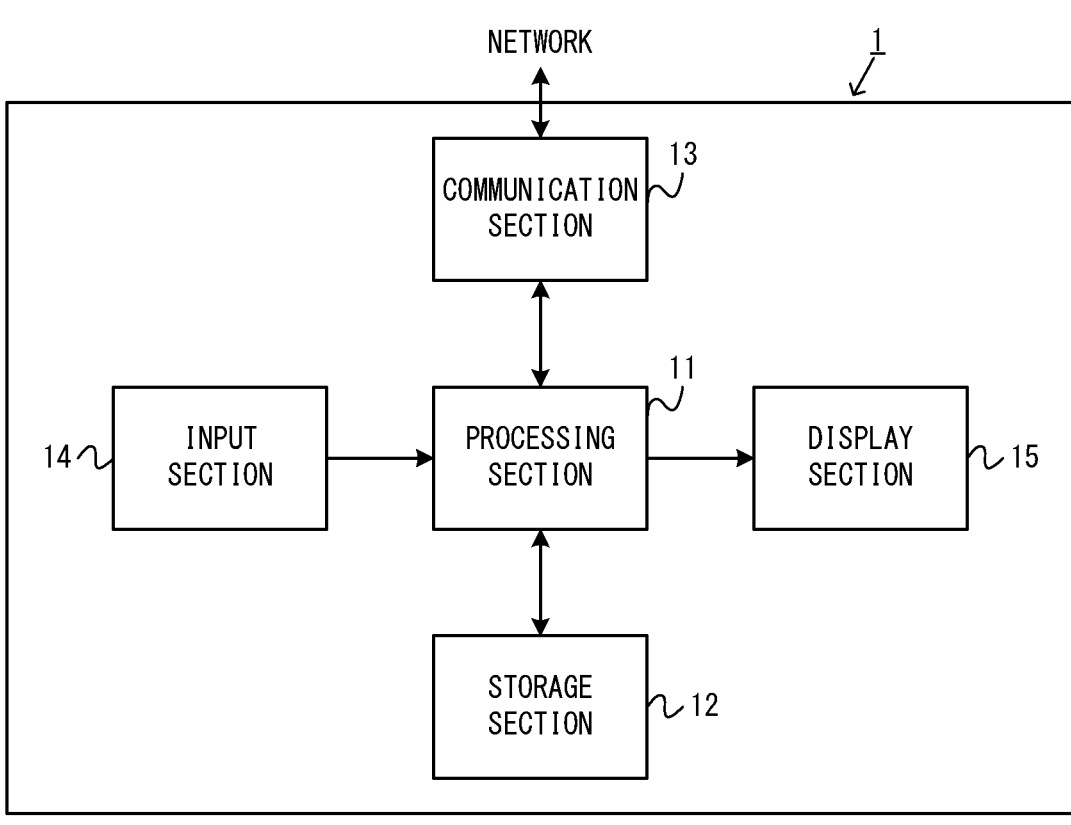
FIG. 2 is a block diagram showing an example of a configuration of a non-limiting server.

FIG. 2 is a block diagram showing an example of the configuration of the server 1. In FIG. 2, each of components included in the server 1 is implemented by one or more information processing apparatuses. In this specification, the "server" means one information processing apparatus (i.e., a server apparatus). When the function of the server is implemented by a plurality of server apparatuses, the "server" means the entirety of a server apparatus group (i.e., a server system). That is, the "server" may be a server apparatus or a server system. When a plurality of information processing apparatuses are included in the server system, these information processing apparatuses may be arranged in the same place or different places. The hardware configuration of the server 1 of the present embodiment may be the same as that for a conventional server.

As shown in FIG. 2, the server 1 includes a processing section 11 and a storage section 12. The processing section 11 is electrically connected to the components 12 to 15 of the server 1. The processing section 11 includes a CPU (Central Processing Unit, in other words, a processor) and a memory. In the server 1, the CPU executes, using the memory, programs stored in the storage section 12, thereby executing various kinds of information processing. The storage section 12 is any storage device (also referred to as "storage medium") that is accessible to the processing section 11. The storage section 12 stores therein programs to be executed in the processing section 11, data to be used for information processing by the processing section 11, data obtained through the information processing, etc. In the present embodiment, the storage section 12 at least stores the program for the process executed on the server side to transmit a video content item to be played on the terminal apparatus 2 in response to a request from the terminal apparatus 2.

The server 1 includes a communication section 13. The communication section 13 is connected to the network 3, and has a function of communicating with other devices (e.g., the terminal apparatus 2) via the network 3. The server 1 further includes an input section 14 and a display section 15 as input/output interfaces.

(Specific Example of Configuration of the Terminal Apparatus 2)

Figure 3:
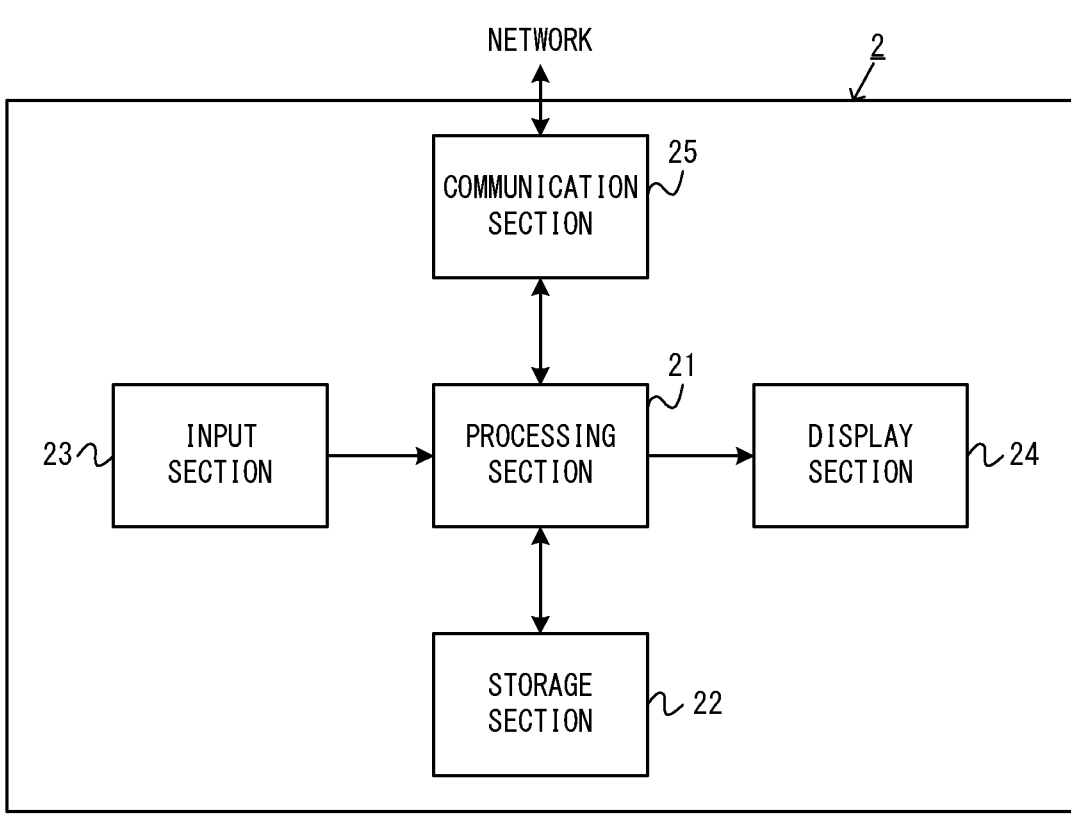
FIG. 3 is a block diagram showing an example of a configuration of a non-limiting the terminal apparatus.

FIG. 3 is a block diagram showing an example of the configuration of the terminal apparatus 2. As shown in FIG. 3, the terminal apparatus 2 includes a processing section 21 and a storage section 22. The processing section 21 is electrically connected to the components 22 to 25 of the terminal apparatus 2. The processing section 21 includes a CPU (in other words, a processor) and a memory. In the terminal apparatus 2, the CPU executes, using the memory, a program (specifically, a program for playing a video content item transmitted from the server 1) stored in the storage section 22, thereby executing various kinds of information processing. The storage section 22 stores therein programs to be executed in the processing section 21, data to be used for information processing by the processing section 21, data obtained through the information processing, etc. The storage section 22 may be a storage medium incorporated in a main body unit (specifically, a unit in which the processing section 21 is provided) of the terminal apparatus 2, or may be a storage medium (e.g., a card type storage medium) attachable/detachable with respect to the main body unit. The program may be stored in the main body unit by being downloaded from the server 1 to the terminal apparatus 2.

The terminal apparatus 2 includes an input section 23. The input section 23 may be any input device that receives an input performed by the user. In the present embodiment, the input section 23 includes a touch panel provided on a screen of a display section 24 described later. The input section 23 may include buttons and/or an inertial sensor (e.g., an acceleration sensor or a gyro sensor), etc., in addition to (or instead of) the touch panel. The input section 23 may be an input device provided in the main body unit of the terminal apparatus 2, or may be an input device (e.g., a controller communicable with the main body unit) separated from the main body unit.

The terminal apparatus 2 includes a display section 24. The display section 24 displays an image (e.g., an image of a video content item, etc.) that is generated through information processing executed in the processing section 21 of the terminal apparatus 2. The display section 24 may be a display device provided in the main body unit of the terminal apparatus 2, or may be a display device separated from the main body unit. The terminal apparatus 2 may include a speaker, a microphone, and/or a camera, etc.

The terminal apparatus 2 includes a communication section 25. In the present embodiment, the communication section 25 has a function of performing communication while being connected to a mobile communication network (in other words, a mobile telephone communication network). That is, the terminal apparatus 2 (specifically, the processing section 21) is connected to the network 3 by using the communication section 25 (in other words, through the communication section 25) via the mobile communication network, and communicates with other devices (e.g., the server 1, etc.). The configuration of the communication section, through which the terminal apparatus 2 performs communication via the network 3, is arbitrary. For example, the communication section 25 may have a function of connecting to a wireless LAN through a communication module with Wi-Fi authentication, or may have both the function of connecting to the mobile communication network and the function of connecting to the wireless LAN.

[2. Outline of Process Performed on Information Processing System]

The process to be executed on the information processing system of the present embodiment will now be outlined. In the present embodiment, the server 1 stores a plurality of video content items and transmits the video content items to the terminal apparatus 2 in response to a request from the terminal apparatus 2.

In the present embodiment, the server 1 stores a plurality of video content items that are managed as a single group (e.g., assigned a common group ID). A plurality of video content items included in a single group are assigned sequential numbers. The sequential numbers are in relation to the contents of the video content items (e.g., the story of the video content items of a narrative). For example, if a plurality of video content items included in one group are of stories continuous with each other, the sequential numbers are assigned in the order of stories. For example, when ten video content items from Episode 1 to Episode 10 are included in one group, the sequential numbers are the episode numbers. For example, when video content items obtained by dividing an original single video content item are included in one group, the sequential numbers are in a chronological order in the original video content item.

Note that there is no limitation on the sequential numbers as long as for one video content item in the group, a sequential relationship with at least one other video content item in the group is specified. The sequential numbers do not need to be assigned so that video content items in a group can be arranged in a single row (i.e., so that for any one video content item, the sequential relationship is specified with all other video content items). For example, where four video content items A to D are included in one group, the same sequential number may be assigned for video content items A to C (i.e., no sequential relationship is set between video content items A to C), and a subsequent sequential number may be assigned for video content item D than for video content items A to C.

Note that, in the present embodiment, while sequential numbers are assigned for a plurality of video content items in one group as described above, the user of the terminal apparatus 2 may view the video content items in an order different from an order of the sequential numbers. That is, in the present embodiment, the plurality of video content items can be played on the terminal apparatus 2 in an order different from an order of the sequential numbers. For example, the user can use the terminal apparatus 2 to specify any desired video content item from among the video content items so that the server 1 transmits the specified video content item to the terminal apparatus 2.

[2-1. Data Stored on Server]

Figure 4:
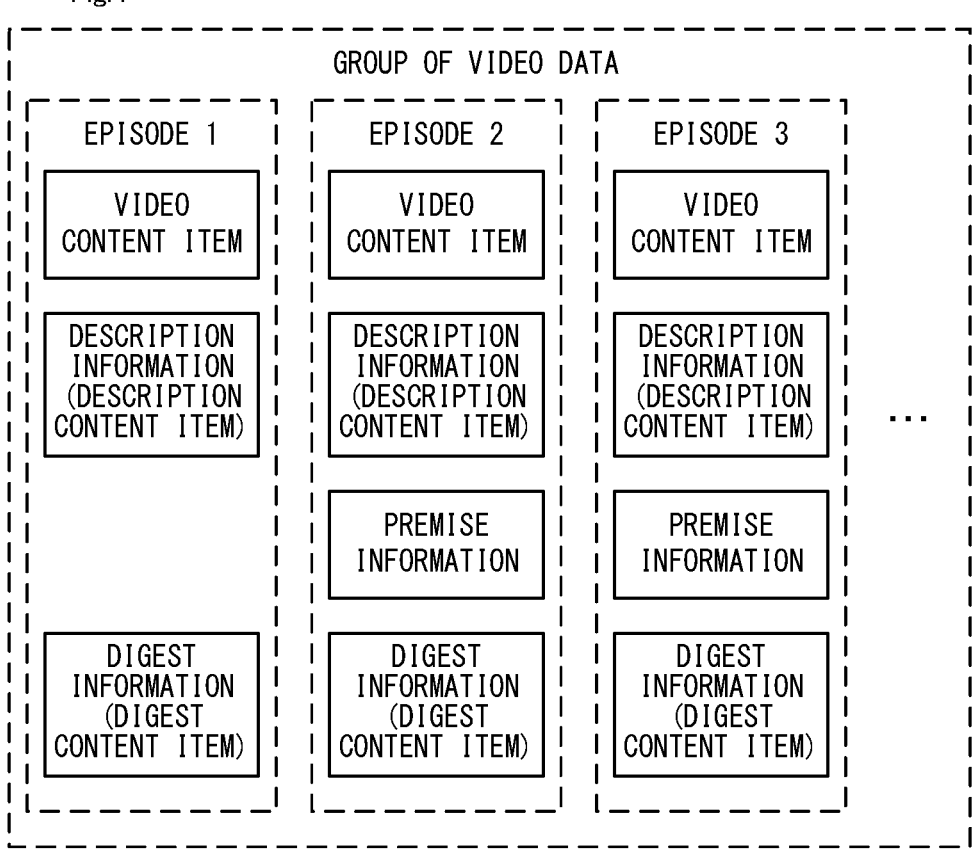
FIG. 4 is a diagram showing an example of a group of video data stored in a non-limiting server.

FIG. 4 is a diagram showing an example of a group of video data stored in a server. The group of video data items shown in FIG. 4 is a group of data items related to a plurality of video content items included in one group. As shown in FIG. 4, the group of video data items includes a plurality of video content items that are assigned sequential numbers. In the example shown in FIG. 4, the video content items are continuous with each other in terms of the story, with each video content item assigned an episode number, and the sequential numbers described above are the episode numbers.

As shown in FIG. 4, a video content item is associated with description information, premise information and digest information. As will be described in detail later, it is not necessary that each video content item is associated with all of the description information, premise information and digest information. In the present embodiment, different information to be associated with a video content item are predetermined by the administrator of the server 1.

The description information indicates a description content item that describes at least a part of the contents of the video content item that is associated with the description information. The description content item may be, for example, a content item that describes a character appearing in the video content item, and may specifically include video of a scene in which the character first appears and/or video of a scene in which the character is active. For example, the description content item may be a content item that describes the land or place that is the setting for the video content item, and may specifically include video of a scene in which the main character arrives at the land or place and/or video of a scene in which the land or place is introduced.

Note that a "content item" as used herein refers to information that is output in any form, such as video, audio or text. That is, description content item may be a content item of video, audio and/or text (or a combination thereof) that describes the contents of the video content item. Note that, in the present embodiment, a description content item is a content item that at least includes video. The "video content item" described above means a content item that includes video, and may be a content item that is a combination of video and audio, or a content item of a combination of video, audio and text.

The description information may be any form of information that indicates a description content item. That is, the description information may be any form of information that can generate a description content item based on the description information. For example, the description information may include data of the description content item itself (e.g., data such as video), or if the description content item is provided by the server 1, the description information may be an ID assigned to the description content item. The description content item may be generated by extracting a portion of a video content item or a digest content item to be described below corresponding to the description content item. In this case, the description information may be information that indicates the extracted portion of the video content item or the digest content item (e.g., a 1-minute to 2-minute portion of the video content item). Note that the description content item may be generated based on the video content item, or may be provided in advance (i.e., stored in the server 1) separately from the video content item. In the former case, a description content item may be generated by adding, to the video of a part of the video content item, audio (e.g., narration) and/or text (e.g., subtitles) that is not part of the video content item. The description content item may or may not include a content item that is not included in the video content item.

Premise information indicates contents to be a premise for the contents of a video content item that is associated with the premise information. Premise information can also be said to be information that indicates contents that will make it easier for a user to understand the video content item associated with the premise information if the user knows the premise information when they view the video content item.

There is no limitation on the specific contents and the format of the premise information. Premise information may be information that indicates the contents of other video content items that are different from a video content item that is associated with the premise information (e.g., characters appearing in the other video content items and/or locations or lands to be the setting for the other video content items, etc.), or it may be information that indicates the other video content items themselves. For example, if a character appears in a video content item, premise information associated with the video content item may be information that indicates the character. For example, it may be information that indicates other video content items in which the character appears (e.g., the video content item of Episode 1 when the video content item is the video content of Episode 3).

As will be described in detail below, premise information is used to identify description content items (or description information) corresponding to other video content items that are different from the video content item that is associated with the premise information. In the present embodiment, the server 1 identifies a description content item based on the premise information and generates an opening content item to be described below using the identified description content item. Note that the premise information may be any information that can identify a description content item (or description information). For example, the premise information may be information that indicates description information or a description content item corresponding to the other video content items. Note that when the premise information is information that indicates the description content item, the premise information may be information of any format with which it is possible to generate a description content item based on the premise information, as with the description information. When the premise information indicates a description content item itself, as described above, description information does not need to be associated with the video content item (i.e., the description information does not need to be stored separately from the premise information).

In the present embodiment, premise information associated with a video content item is information regarding another video content item (specifically, information that identifies another video content item) whose sequential number is before the video content item among a plurality of video content items (included in the same group as the video content item). Note that the "information regarding another video content item" described above may be information that indicates the video content item itself (e.g., the ID of the video content item) or information that indicates the contents of the video content item (e.g., information that indicates characters appearing in the video content item). As will be described in detail below, this can make it easier for the user to understand the video content item even if the user has not viewed other video content items whose sequential numbers are before the video content item. Note that, in other embodiments, the premise information associated with a video content item may be information regarding another video content item whose sequential number is after the video content item among a plurality of video content items (included in the same group as the video content item).

Digest information indicates a content item of a digest version (hereinafter referred to as "digest content item") of the video content item associated with the digest information. A digest content item is a content item that includes a portion of the video content item corresponding to the digest content item. For example, a digest content item may be a content item that includes video of one scene to be a highlight of the video content item or may be a content item that includes video obtained by stitching together a plurality of scenes to be a highlight of the video content item. Note that a digest content item may be a content item that is obtained by adding video, audio and/or text, etc., which is not a part of the video content item to the video of a part of the video content item. The digest content item may or may not include a content item that is not included in the video content item.

The digest information may be any form of information that indicates a digest content item. That is, the digest information may be any form of information with which it is possible to generate a digest content item based on the digest information. For example, the digest information may include data of a digest content item (e.g., data of video, etc.), or if a digest content item is provided on the server 1, the digest information may be an ID assigned to the digest content item. A digest content item may be generated by extracting a portion of a video content item that is associated with the digest content item, in which case the digest information may be information that indicates the extracted portion of the video content item (e.g., a 1-minute to 2-minute portion of the video content item).

Note that a description content item and a digest content item that correspond to a video content item may or may not partially overlap with each other in terms of contents.

It is not necessary that one video content item be associated with all of description information, premise information and digest information. For example, as shown in FIG. 4, no premise information is associated with a video content item whose sequential number is first (i.e., the first video content item). This is because it is considered that the user does not need to know the contents of other video content items in order to view the video content item whose sequential number is first.

[2-2. Generation of Opening Content Item]

In the present embodiment, when the user specifies a video content item to be viewed on the terminal apparatus 2, the terminal apparatus 2 transmits a request to the server 1 to transmit the video content item. In response to this request, the server 1 generates an opening content item that corresponds to the video content item and transmits the opening content item and the video content item to the terminal apparatus 2. Hereinafter, a video content item that has been specified by the user to be viewed from among a plurality of video content items included in one group will be referred to as "specified video content item".

Here, an opening content item is a content item that is played on the terminal apparatus 2 prior to the playback of a video content item that corresponds to the opening content item. In the present embodiment, the opening content item is a content item that describes, for the user, the contents of other video content items whose sequential numbers are before the video content item corresponding to the opening content item. For example, when a certain character appears in a specified video content item, if the user does not know much about this character (i.e., if the user has not viewed a video content item whose sequential number is before the specified video content item and in which this character appeared), the user will not be able to fully understand the contents of the specified video content item. Therefore, in the present embodiment, when the server 1 transmits the specified video content item to the terminal apparatus 2, the server 1 generates and transmits an opening content item that corresponds to the specified video content item, so that the user can grasp the contents (the contents regarding the character in the example described above) of other video content items whose sequential numbers are before the specified video content item. Even if the user has not viewed previous video content items of a plurality of video content items in a group (i.e., video content items whose sequential numbers are before the specified video content item), the user can know the contents of the previous video content items by viewing the opening content item, which makes it easier to understand the contents of the specified video content item. The method for generating an opening content item will now be described.

Figure 5:
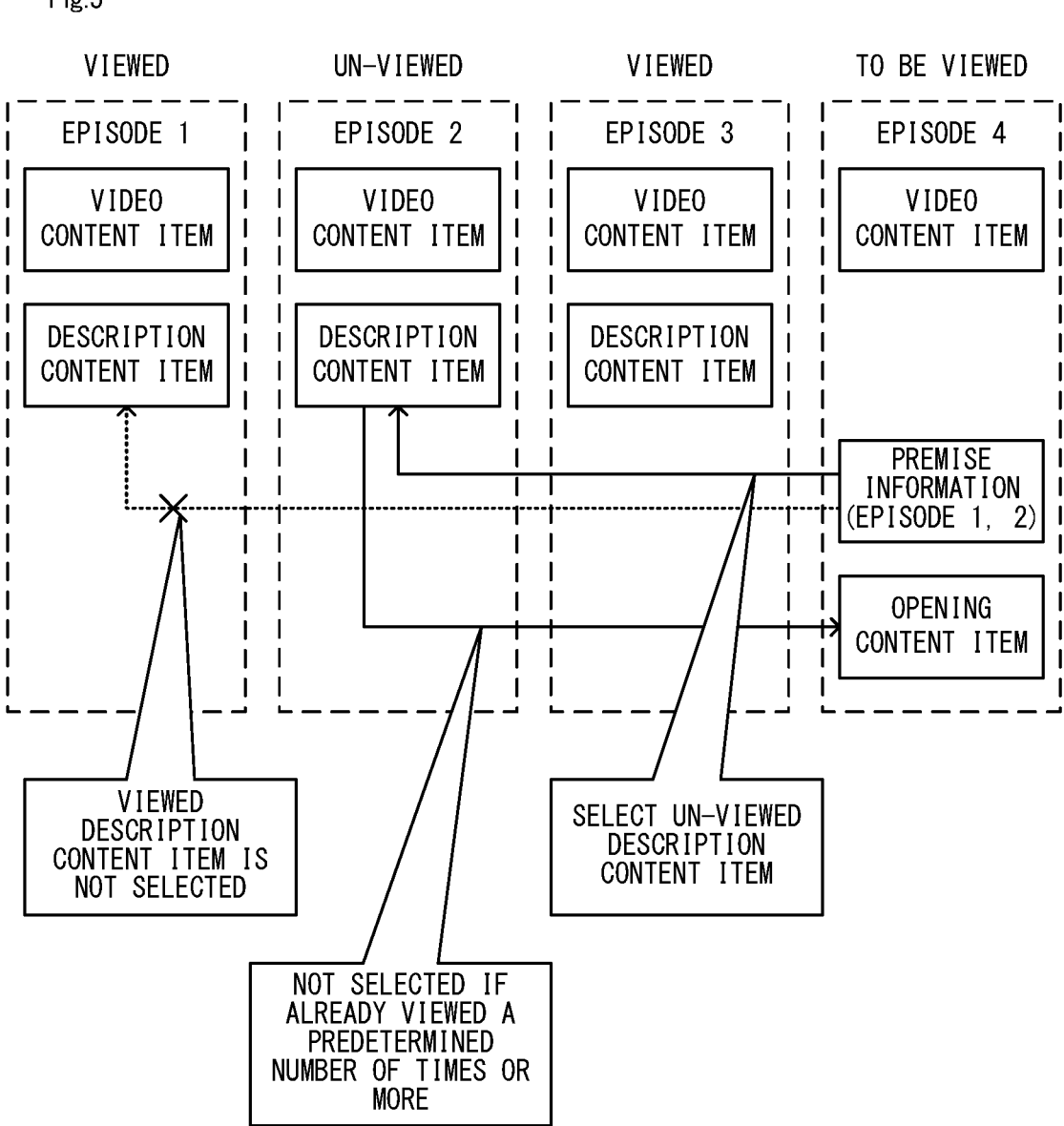
FIG. 5 is a diagram showing an example of a method for generating an opening content item.

FIG. 5 is a diagram showing an example of a method for generating an opening content item. The example shown in FIG. 5 is an example in which, from among a plurality of video content items in one group, a video content item of Episode 4 is specified by the user and transmitted to the terminal apparatus 2 (this similarly applies also to FIG. 6 to FIG. 8 to be discussed below). In the example shown in FIG. 5, it is assumed that the user has already viewed the video content items of Episode 1 and Episode 3 and has not yet viewed the video content item of Episode 2, out of the three video content items whose sequential numbers are before the video content item of Episode 4 (this similarly applies also to FIG. 6 to FIG. 8 to be discussed below). FIG. 5 does not show information that is not used for the generation of the opening content item in the example shown in FIG. 5, of the information shown in FIG. 4 (this similarly applies also to FIG. 6 to FIG. 8 to be discussed below).

In the example shown in FIG. 5, when the request described above is received from the terminal apparatus 2, the server 1 first identifies a description content item to be used for generating the opening content item based on premise information that is associated with the specified video content item. Specifically, from among description content items corresponding to video content items whose sequential numbers are before the specified video content item, the server 1 identifies a description content item that is identified by the premise information (i.e., the description content item indicated by the description information associated with the video content item indicated by the premise information) and that is un-viewed. Note that, in the present embodiment, the server 1 stores history information indicating the viewing history regarding each video content item (specifically, information indicating whether or not the user has viewed the video content item) for each user. The server 1 determines whether it is a viewed video content item or an un-viewed video content item based on the history information. As described above, in the present embodiment, an opening content item is generated based on the premise information, which is associated with a specified video content item corresponding to the opening content item, and the history information regarding the video content item.

In the example shown in FIG. 5, the premise information associated with the specified video content item indicates the video content item of Episode 1 and the video content item of Episode 2. Therefore, in the example shown in FIG. 5, from among a description content item of Episode 1 (i.e., the description content item indicated by the description information associated with the first video content item) and the description content item of Episode 2, the server 1 excludes the description content item of Episode 1 corresponding to a viewed video content item and selects the description content item of Episode 2 corresponding to an un-viewed video content item. This means that the description content item for Episode 2 has been identified as the description content item to be used for generating the opening content item.

Then, the server 1 generates an opening content item based on the identified description content item. That is, the server 1 generates an opening content item that includes the identified description content item. Note that the description content item may be prepared (or "stored") in advance on the server 1, or it may be generated based on the description information. There is no limitation on the specific method of generating the opening content item based on the description content item. For example, the server 1 may use the description content item, as it is, as the opening content item, or if there are a plurality of identified description content items, the server 1 may generate the opening content item by splicing those description content items together. The server 1 may also generate the opening content item by adding other video, audio, and/or text, etc., to the description content item.

As described above, in the present embodiment, if the history information indicates that another video content item corresponding to the premise information associated with the specified video content item (i.e., a video content item that is identified by the premise information) is un-viewed, the server 1 generates an opening content item so as to include some of the contents of the other video content item corresponding to the premise information (specifically, the description content item identified by the premise information). That is, in the present embodiment, if the history information indicates that the other video content item corresponding to the premise information associated with the specified video content item has been viewed, the server 1 generates an opening content item not based on the premise information. Then, since the opening content item is less likely to include contents the user already knows, it is possible to generate an effective opening content item that helps the user understand the specified video content item. Note that, in other embodiments, the server 1 may generate an opening content item so as to include description content items corresponding to viewed video content items.

In the present embodiment, an upper limit (e.g., 60 seconds) is set for the length of the opening content item (e.g., the length of playback time of the video if the opening content item includes video). Here, when an opening content item is generated based on the description content item selected by the method described above, the length of the opening content item may exceed the upper limit. For example, where three description content items are selected, each of which is 30 seconds in length while the upper limit for the length of the opening content item is 60 seconds, if the opening content item is generated to include these description content items, the length of the opening content item will be 90 seconds, exceeding the upper limit.

Therefore, in the present embodiment, if the length of the opening content item based on description content items selected by the method described above exceeds the upper limit, the server 1 generates an opening content item using abbreviated versions of the description content items (hereinafter referred to as "abbreviated description content item"). An abbreviated description content item is a content item that is shorter (e.g., if the description content includes video, the length of the playback time of the video is shorter) than the corresponding description content item. For example, if the length of the description content item is 15 seconds, the length of the abbreviated description content item is 10 seconds. The server 1 may store abbreviated description content items in advance, or the server 1 may generate an abbreviated description content item by extracting a portion of a description content item.

Note that "the case where the length of the opening content item based on the description content item exceeds the upper limit" as described above is not on a condition that the opening content item is actually generated, but means to include cases where the length of the opening content item would exceed the upper limit if the opening content item were to be actually generated using the opening content item. In the present embodiment, the server 1 may determine whether the length of the opening content item generated using the description content item exceeds the upper limit after actually generating the opening content item, or based on the length of the description content item used to generate the opening content item, without actually generating the opening content item.

The server 1 does not need to use abbreviated description content items for all of the plurality of description content items used to generate the opening content item. As long as the length of the opening content item becomes less than or equal to the upper limit, the server 1 may generate the opening content item by using abbreviated description content items for some of the description content items and using the other description content items as they are. For example, if the priority to be described below is set for the description content item, the server 1 may select a description content item for which an abbreviated version is used based on this priority.

As described above, in the present embodiment, if the total length of one or more description content items that are identified by premise information associated with the specified video content item and that are indicated as un-viewed in the history information exceeds the upper limit, the server 1 generates an additional content item (i.e., the opening content item) using an abbreviated description content item for any of the one or more description content items so that the total is less than or equal to the upper limit. Then, it is possible to prevent the length of the opening content item from becoming too long. Thus, it is possible to prevent the data volume of the opening content item transmitted to the terminal apparatus 2 from becoming too large.

When the opening content item is generated as described above, the server 1 transmits the specified video content item and the opening content item to the terminal apparatus 2. In the present embodiment, the server 1 transmits the specified video content item and the opening content item to the terminal apparatus 2 so that the opening content item is output before the specified video content item. Thus, it is possible to make it more likely that the user views the opening content item before viewing the specified video content item.

Note that "transmitting the specified video content item and the opening content item to the terminal apparatus 2" as described above means not to be limited to transmitting both content items at the same time. For example, when each content item is streamed and played on the terminal apparatus 2, the server 1 transmits the content items so that the opening content item is played first and then the specified video content item is played. The server 1 may transmit the opening content item and the specified video content item together in a single piece of data. For example, the server 1 may first transmit the opening content item to the terminal apparatus 2, and then transmit the specified video content item to the terminal apparatus 2 after determining that the opening content item has been viewed on the terminal apparatus 2. For example, the server 1 may transmit the opening content item and the specified video content item with playback restriction to the terminal apparatus 2, and then lift the restriction on the specified video content item after determining that the opening content item has been viewed on the terminal apparatus 2. For example, an application for playing content items on the terminal apparatus 2 may implement a function that allows a specified video content item to be played on the condition that the opening content item has been played. Then, the server 1 may transmit these content items in any order. In other embodiments, there is no limitation on the order in which the specified video content item and the opening content item are played on the terminal apparatus 2. For example, on the terminal apparatus 2, one of the specified video content item and the opening content item that has been specified by the user may be played, or the order of playback may be specified by the user.

Note that if there is no premise information associated with the specified video content item (in the example shown in FIG. 4, if the specified video content item is a video content item of Episode 1), the server 1 does not identify a description content item and does not generate an opening content item. As a result, the server 1 transmits the specified video content item to the terminal apparatus 2 without the opening content item. Thus, in the present embodiment, when the specified video content item is the video content item whose sequential number is first, the server 1 transmits the specified video content item to the terminal apparatus 2 without generating an opening content item. Then, the server 1 can reduce the processing load and the amount of communication traffic by not generating and transmitting opening content items that are less necessary. Note that, in other embodiments, premise information (e.g., premise information regarding a video content item whose sequential number is after the video content item) may be associated with the video content item of Episode 1.

As described above, in the present embodiment, the opening content item is generated to include the description content item associated with the un-viewed video content item. Here, in the present embodiment, opening content items may possibly be generated for different video content items by using the same description content item. For example, for the video content item of Episode 4 and for the video content item of Episode 5, the opening content items may possibly be generated by using the same description content item of Episode 2. Then, there may be a case where the description content item of Episode 2 has been viewed for a user while the video content item of Episode 2 has been un-viewed for the user. In such a case, there is little need for the user to repeatedly view the same description content item.

Therefore, in the present embodiment, the server 1 does not use the description content item that has been viewed more than a reference number of times (e.g., three times) to generate the opening content item. Specifically, in addition to storing the viewing history of video content items, the server 1 stores the viewing history (specifically, the number of times it has been viewed) for description content items. Then, when generating an opening content item, a digest content item is used on the condition that the number of times the description content item used for the generation has been viewed is less than the reference number of times. For example, in the example shown in FIG. 5, if the number of times the description content item of Episode 2, which is the description content item identified by the premise information and is associated with an un-viewed video content item, has been viewed is equal to or greater than the reference number of times, the server 1 does not use the description content item for generating the opening content item (see FIG. 5). Then, it is possible to prevent the same description content item from being included for a number of times that is equal to or greater than the reference number of times in opening content items corresponding to different video content items. Note that there is no limitation on the reference number of times, and the reference number of times may be set to one (i.e., whether or not to use a description content item for generating an opening content item may be determined based on whether or not it has been viewed).

As described above, in the present embodiment, the server 1 stores history information indicating the viewing history of the user for description content items, and when the user views an opening content item, the server 1 updates the history information so as to indicate that the description content item included in this opening content item has been viewed. If the history information indicates that the description content item identified by the premise information associated with the specified video content item has been viewed for a number of times that is equal to or greater than the reference number of times, the server 1 generates the opening content item without including this description content item. Then, the server 1 can reduce the possibility of including description content items that are less necessary in opening content items, and can generate opening content items that include more useful information for the user. Note that, in other embodiments, the server 1 may not require that the number of times the description content item has been viewed is less than the reference number of times as a condition for the description content item to be used for generating the opening content item.

Also, in other embodiments, for a particular one of description content items, if the description content item is identified by the premise information associated with the specified video content item, the server 1 may generate the opening content item so as to include the description content item irrespective of the viewing history of the description content item (e.g., even if the video content item corresponding to this description content item has been viewed). For example, the server 1 may set a description content item that is important in terms of the contents as the particular description content item so that the description content item is repeatedly included in the opening content item as the user views different video content items.

Figure 6:
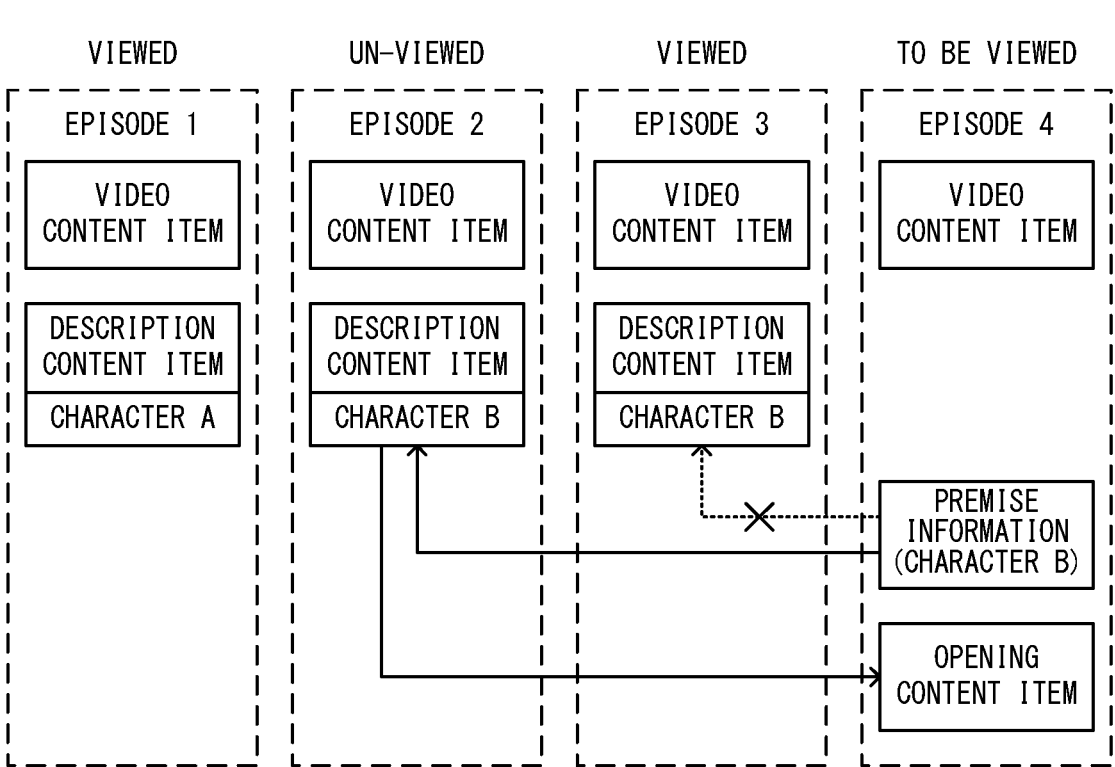
FIG. 6 is a diagram showing another example of a method for generating an opening content item.

FIG. 6 is a diagram showing another example of a method for generating an opening content item. While the premise information indicates a video content item in the example shown in FIG. 5, the premise information indicates the contents of a video content item (e.g., characters, locations, etc., appearing in the video content item) in the example shown in FIG. 6. Specifically, in the example shown in FIG. 6, the premise information indicates Character B. That is, the video content item of Episode 4 is premised on Character B.

When the premise information indicates the contents of a video content item as described above, the description content item has, attached thereto, tag information that indicates the contents of the video content item associated with the description content item (specifically, the tag information is attached to the description information that indicates the description content item). In the example shown in FIG. 6, the video content item of Episode 1 includes contents related to Character A (e.g., Character A appears in the video content item of Episode 1), and tag information that indicates Character A is attached to the description content item associated with the video content item of Episode 1. The video content items for Episode 2 and Episode 3 include contents related to Character B, and tag information that indicates Character B is attached to the description content item of Episode 2 and the description content item of Episode 3. The tag information is set so as to indicate the same contents as those indicated by the premise information associated with at least one of the group of video content items.

Note that the contents indicated by the premise information are not limited to one kind but may be a plurality of kinds of contents. For example, the premise information may be information that indicates Character A and Character B, or may be information that indicates Character B and Location a. As with the premise information, the tag information attached to the description content item is not limited to one kind but may be a plurality of kinds. For example, tag information indicating Character A and tag information indicating Character B may be attached to one description content item.

In the example shown in FIG. 6, when there is a request from the terminal apparatus 2 to transmit the video content item of Episode 4 as the specified video content item, the server 1, as in the example shown in FIG. 5, identifies a description content item to be used for the generation of an opening content item based on the premise information associated with the specified video content item. Specifically, the server 1 identifies a description content item to which tag information indicating the same contents as those indicated by the premise information associated with the specified video content item is attached. In the example shown in FIG. 6, since the premise information associated with the video content item of Episode 4 indicates Character B, the server 1 identifies description content items for Episode 2 and Episode 3 to which the tag information indicating Character B is attached. Note that when a plurality of tag information are attached to the description content item, the server 1 identifies the description content item to which at least one tag information indicating the same contents as those indicated by the premise information is attached. Thus, also in the example shown in FIG. 6, as in the example shown in FIG. 5, a description content item can be identified by the premise information.

Also in the example shown in FIG. 6, processes other than the process of identifying a description content item by the premise information are similar to those of the example shown in FIG. 5. That is, the server 1 identifies, as a description content item used for the generation of an opening content item, a description content item that is identified by the premise information from among the description information associated with video content items whose sequential numbers are before the specified video content item and that is indicated by the description information associated with an un-viewed video content item. In the example shown in FIG. 6, an opening content item is generated using the description content item of Episode 2 corresponding to an un-viewed video content item from among the description content item of Episode 2 and the description content item of Episode 3 identified by the premise information. Note that it is assumed that in the example shown in FIG. 6, the number of times the description content item of Episode 2 has been viewed is less than the reference number of times described above.

As described above, in the present embodiment, the premise information is information with which it is possible to identify description content items that describe other video content items different from the video content item associated with the premise information (specifically, information that indicates video content items corresponding to the description content items as shown in FIG. 5, or information that indicates the contents of video content items corresponding to the description content items as shown in FIG. 6). An opening content item includes a description content item that is identified by the premise information associated with the specified video content item and that is related to a video content item indicated as being un-viewed in the history information. Then, an opening content item is generated so as to include the contents related to video content items that have been un-viewed by the user, and is less likely to include contents that the user already knows. Therefore, it is possible to generate an opening content item that is effective in terms of making it easier for the user to understand the specified video content item. The description content item to be used for the opening content can be easily identified by the premise information.

In the present embodiment, an opening content item may be generated by using a digest content item in addition to the description content item described above. The method for generating an opening content item when a digest content item is used will now be described below.

Figure 7:
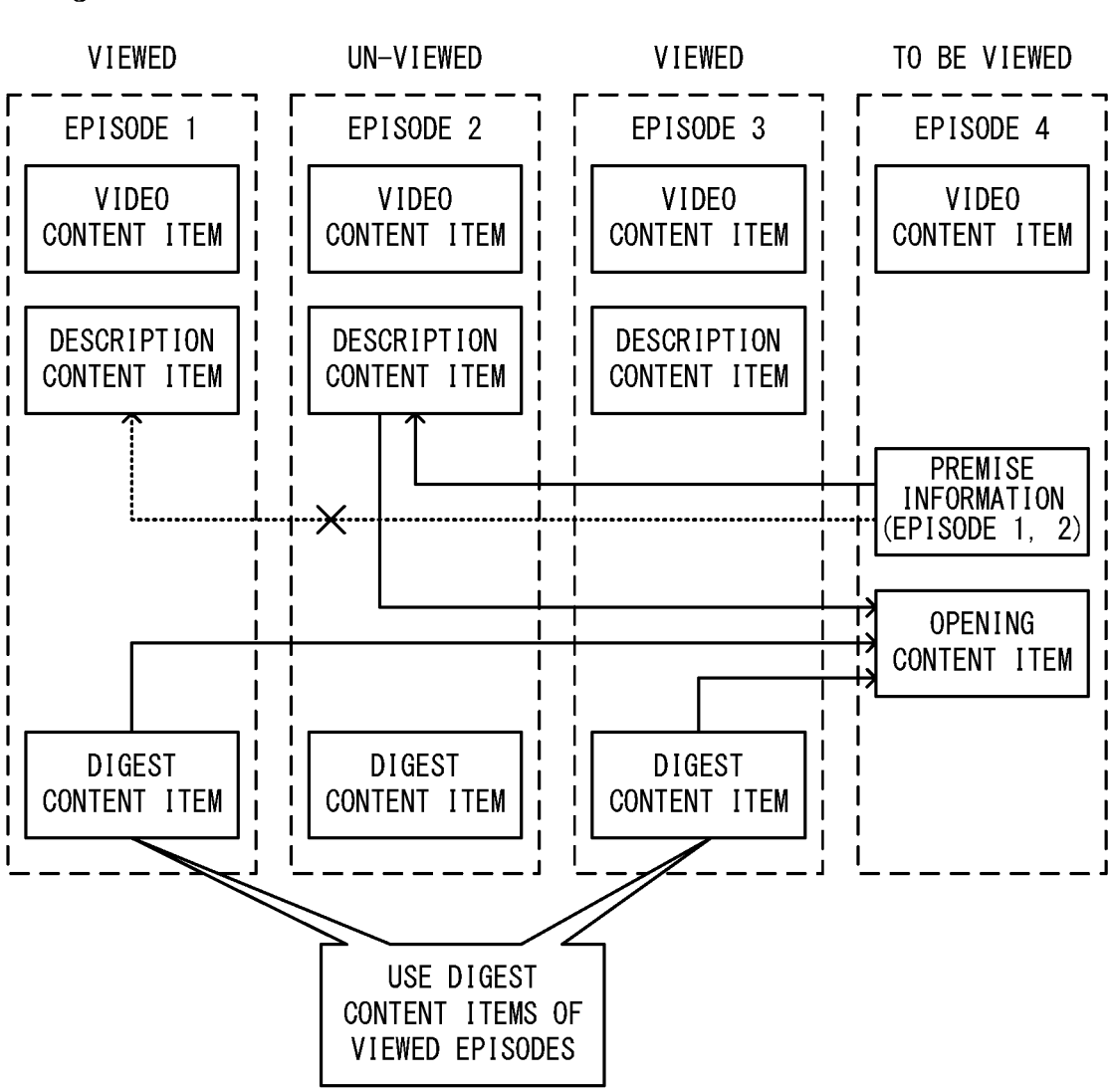
FIG. 7 is a diagram showing another example of a method for generating an opening content item.

FIG. 7 is a diagram showing another example of a method for generating an opening content item. In the example shown in FIG. 7, the description content item used for the generation of the opening content item is identified as in the example shown in FIG. 5. The example shown in FIG. 7 is an example in which an opening content item that includes a description content item further includes a digest content item.

Here, in the present embodiment, a lower limit (e.g., 30 seconds) is set for the length of the opening content item. In the present embodiment, if the length of the opening content item generated using the description content item (i.e., the opening content item generated based on the premise information associated with the specified video content item) is less than the above lower limit, the server 1 generates an opening content item including a digest content item so that the length is equal to or greater than the lower limit. That is, the server 1 adds the digest content item to the opening content item that includes the description content item so that the length of the opening content item equal to or greater than the lower limit. This prevents the opening content item from becoming too short. Note that "the case where the length of the opening content item generated using the description content item is less than the lower limit" is not on a condition that the opening content item is actually generated, but includes the case where the length of the opening content item would be less than the lower limit if the opening content item were to be generated using the description content item.

As described above, in the present embodiment, the server 1 generates an opening content item including a digest content item on the condition that the length of the opening content item to be generated using the description content item is less than the lower limit. Here, in other embodiments, there is no limitation on the condition for generating an opening content item including a digest content item, and the condition may be different from the condition described above. For example, in other embodiments, the server 1 may generate an opening content item if the ratio or number of un-viewed video content items among those video content items whose sequential numbers are before the specified video content item is equal to or greater than a predetermined value (e.g., if the ratio is equal to or greater than 50% or if the number is equal to or greater than 5). In the case described above, it is believed that the user does not fully grasp the contents related to one or more video content items whose sequential numbers are before the specified video content item, and it is possible to make the user understand the contents by having the user view a digest content item included in the opening content item.

As described above, in the present embodiment, the server 1 stores digest information indicating digest content items of the video content items included in one group (FIG. 4). The server 1 generates an opening content item that includes a digest content item based further on the digest information corresponding to other video content items whose sequential numbers are before the specified video content item from among the plurality of video content items. In the example shown in FIG. 7, the specified video content item is a video content item of Episode 4, and digest content items that can be included in the opening content item are digest content items from Episode 1 to Episode 3. Then, the contents of the opening content item can be made more substantial, and it is possible to generate a useful opening content item for the user. Note that, in other embodiments, the server 1 does not need to include digest content items in opening content items, and the server 1 does not need to provide digest content items.

In the present embodiment, the server 1 generates an opening content item using a digest content item corresponding to the viewed video content item from among digest content items corresponding to other video content items whose sequential numbers are before the specified video content item. In the present embodiment, the description content item to be included in the opening content item is determined based on the premise information, whereas the digest content item to be included in the opening content item is determined not based on the premise information (i.e., independently of the premise information). In the example shown in FIG. 7, the server 1 generates the opening content item using the digest content items of Episode 1 and Episode 3 while excluding the digest content item of Episode 2, which is un-viewed, from among the digest content items of Episode 1 to Episode 3. Then, since the opening content item is generated so that the contents that have not been viewed by the user are not included in the opening content item, it is possible to reduce the possibility that the user is informed more than necessary of the contents of the video content items that the user has not viewed. Then, for example, it is possible to reduce the possibility that the user knows too much about the contents of the video content items that have not been viewed by the user, thereby detracting from the interest in the video content items.

In other embodiments, the server 1 may generate an opening content item using the digest content item corresponding to the un-viewed video content item under certain conditions. For example, in other embodiments, the server 1 may add, to the digest information, specification information indicating that the digest content item corresponding to a video content item is not used for the generation of the opening content item when the video content item is un-viewed. In this case, the server 1 generates an opening content item using a digest content item corresponding to a viewed video content item or a digest content item for which specification information is not attached to the digest information, from among digest content items corresponding to other video content items whose sequential numbers are before the specified video content item. That is, the server 1 generates an opening content item by excluding digest content items that correspond to un-viewed video content items and for which specification information is attached to the digest information, from among digest content items corresponding to other video content items whose sequential numbers are before the specified video content item.

Note that depending on the contents of the digest content item, there may be a case in which there is no problem for the user who has not viewed a video content item to view a digest content item corresponding to the video content item (e.g., without detracting from the interest in the video content item). In such a case, the server 1 does not attach specification information to digest information that indicates the digest content item. On the other hand, if it is believed that there is a problem for the user who has not viewed a video content item to view a digest content item corresponding to the video content item (e.g., it detracts from the interest in the video content item), the server 1 attaches specification information to digest information that indicates the digest content item. Then, it is possible to increase the candidate digest content items to be used for the generation of the opening content item, thereby making easier the generation of the opening content item.

As described above, the server 1 generates an additional content item (i.e., the opening content item) (a) without including digest content items that correspond to video content items indicated as un-viewed in the history information, or (b) without including digest content items that correspond to video content items indicated as un-viewed in the history information and that are indicated by digest information to which specification information is attached. Then, it is possible to reduce the possibility that the user is informed, through the opening content item, more than necessary of the contents of the video content items that the user has not viewed.

Note that in other embodiments, the server 1 may generate additional content items (i.e., the opening content items) so as to include digest content items corresponding to un-viewed video content items without including digest content items corresponding to viewed video content items. Then, it is possible to make the user better understand the contents of un-viewed video content items.

In other embodiments, also with digest content items, as with description content items, the server 1 may not use digest content items for which the number of times they have been viewed is equal to or greater than the reference number of times for the generation of opening content items. That is, the server 1 may store the viewing history of digest content items (specifically, the number of times they have been viewed), and when generating an opening content item, a digest content item may be used for the generation on the condition that the number of times the digest content item has been viewed is less than the reference number of times.

There is no limitation on the specific method for generating an opening content item including the description content item and a digest content item. For example, the server 1 may generate an opening content item that includes the description content item and a digest content item by generating an opening content item that includes a description content item and then adding a digest content item to the generated opening content item. For example, the server 1 may generate an opening content item by combining together a description content item and a digest content item identified based on the premise information and the history information.

If the length of the opening content item including the digest content item exceeds the upper limit described above, the server 1 generates an opening content item using an abbreviated version of the digest content item (hereinafter referred to as "abbreviated digest content item"). An abbreviated digest content item is a content item that is shorter than the corresponding digest content item. For example, if the length of the digest content item is 30 seconds, the length of the abbreviated digest content item is 15 seconds. The server 1 may store abbreviated digest content items in advance or may generate an abbreviated digest content item by extracting a portion of a digest content item.

Note that the server 1 does not need to use abbreviated digest content items for all of a plurality of digest content items used to generate opening content items. As long as the length of the opening content item is less than or equal to the upper limit, the server 1 may generate an opening content item by using abbreviated digest content items for some of the plurality of digest content items while using other digest content items as they are. For example, if the priority to be described below is set for digest content items, the server 1 may select digest content items for which abbreviated versions are used based on this priority.

As described above, in the present embodiment, if the length of an opening content item including one or more digest content items selected based on a predetermined criterion from among digest content items corresponding to a plurality of video content items in one group exceeds the upper limit, the server 1 generates an opening content item using an abbreviated version of a content item for at least any of the one or more digest content items. Then, it is possible to prevent the length of an opening content item from becoming too long. It is also possible to prevent the data volume of the opening content item from becoming too large. Note that in the present embodiment, the "predetermined criterion" is a criterion that "it is a digest content item corresponding to a viewed video content item among digest content items corresponding to other video content items whose sequential numbers are before the specified video content item". Note however that in other embodiments, the predetermined criterion is arbitrary, and a criterion different from the present embodiment (e.g., it may be a criterion of being selected randomly) may be used.

Figure 8:
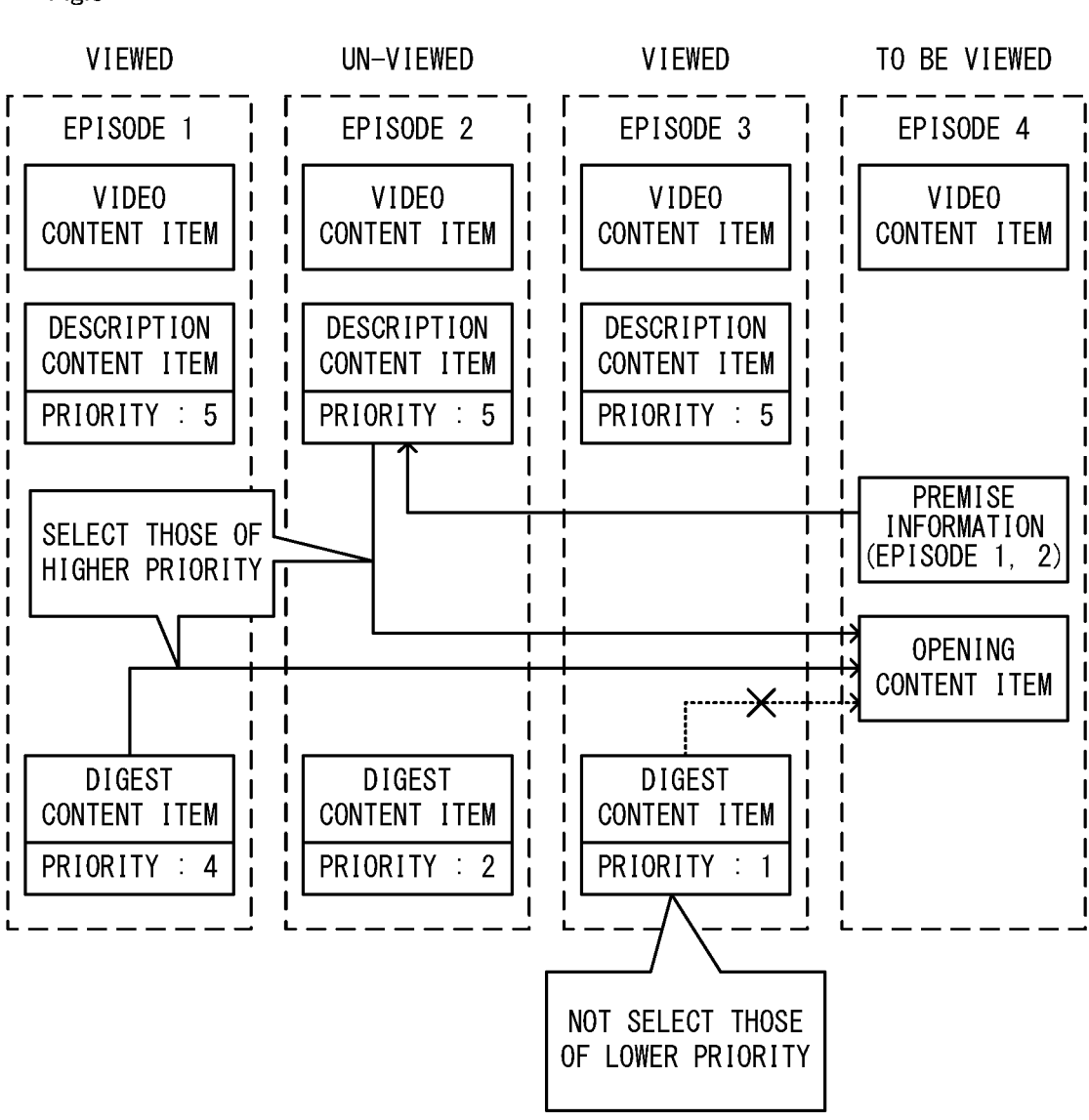
FIG. 8 is a diagram showing an example of a method for generating an opening content item according to a variation.

In other embodiments, the server 1 may set priorities for description content items and digest content items, and determine a description content items and a digest content item to be used for an opening content item based on priority. Referring to FIG. 8, a variation of generating an opening content item based on priority will be described below.

FIG. 8 is a diagram showing an example of a method for generating an opening content item according to the variation. In this variation, priorities are set for description content items and digest content items (see FIG. 8). Specifically, information indicating a priority is associated with each description information and each digest information. Note that in the example shown in FIG. 8, it is assumed that the priority can take a 5-step value from 1 to 5. In the example shown in FIG. 8, it is assumed that the priority of the description content item is set to 5, indicating the highest priority, and the priority of the digest content item is set to any value from 1 to 4.

Also in this variation, as in the present embodiment, the server 1 selects a description content item to be used for the opening content item from among those corresponding to un-viewed video content items, and selects a digest content item to be used for the opening content item from among those corresponding to viewed video content items. In this variation, the server 1 selects content items to be used for an opening content item (i.e., a description content item and a digest content item) in the order of priority so as to be within the upper limit described above. In the example shown in FIG. 8, a description content item that is identified by premise information and that corresponds to an un-viewed video content item is a description content item of Episode 2. Digest content items that correspond to viewed video content items are the digest content items of Episode 1 and Episode 3. Therefore, the server 1 selects content items to be used for the generation of the opening content item in the order of priority so as to be within the upper limit described above from among the description content item of Episode 2 and the digest content items of Episode 1 and Episode 3. In the example shown in FIG. 8, it is assumed that the length of the opening content item would exceed the upper limit if these three content items are all used. Therefore, the server 1 generates the opening content item by selecting the description content item of Episode 2 whose priority is 5 and the digest content item of Episode 1 whose priority is 4, while excluding the digest content item of Episode 3 whose priority is 1.

Note that in this variation, if there are a plurality of description content items that are identified by premise information and that correspond to un-viewed video content items, and if the opening content item including these description content items exceeds the upper limit, the server 1 selects a description content item to be used for the opening content item from among these description content items based on priority (note that in this case, digest content items whose priorities are lower than description content items will not be selected). That is, if the total length of one or more description content items that are identified by premise information associated with the specified video content item and that correspond to video content items indicated as un-viewed in the history information exceeds the upper limit, the server 1 selects the description content item to be included in the opening content item based on the priority set for the one or more description content items. Then, as in the present embodiment, it is possible to prevent the length of the opening content item from becoming too long.

As described above, in this variation, the server 1 determines the digest content to be included in the opening content item based on the priority set for the digest content item. Then, for example, digest content items that are more important for viewing the specified video content item can be preferentially included in the opening content item, thus making it easier to generate opening content items that are useful to the user. Since digest content items to be included in the opening content item can be selected, it is possible to prevent the length of the opening content item from becoming too long. The method of selecting digest content items to be included in the opening content item based on priority is not limited to the method described above. For example, in other embodiments, the server 1 may select digest content items based on priority not based on the history information (i.e., not depending on whether the video content item is un-viewed).

In the variation described above, common priorities are set for description content items and digest content items, but in other embodiments, different priorities may be set for description content items and digest content items. For example, the server 1 may set any one of the priorities from 1 to 5 for each description content item and any one of the priorities from 1 to 5 for each digest content item. In this case, the server 1 first selects a description content item to be used for the opening content item based on priority (as well as the premise information and the history information). If the length of the opening content item including the selected description content item is less than the upper limit, the server 1 selects a digest content item to be used for the opening content item based on priority. Note that if the length of the opening content item including the selected description content item is equal to or greater than the upper limit, the server 1 does not select a digest content item. Thus, even when different priorities are set for description content items and digest content items, content items to be used for the opening content item (i.e., a description content item and a digest content item) can be selected using priority in the same manner as in the variation described above.

Note that in other embodiments, the upper limit and the lower limit do not need to be set for the opening content item. If the upper limit is not set for the opening content item, the server 1 do not need to use abbreviated versions of description content items and digest content items, and the server 1 may generate an opening content item without excluding some description content items from the description content items that are identified by premise information associated with the specified video content item.

In other embodiments, the opening content item may have different upper limits for description content items and for digest content items. That is, an upper limit for the total length of description content items used for the opening content item and an upper limit for the total length of digest content items used for the opening content item may be set separately. In this case, the server 1 determines the description content item to be used for the opening content item to be less than or equal to the upper limit and the digest content item to be used for the opening content item to be less than or equal to the upper limit. Note that the method of determining the description content item and the digest content item may be the same as the embodiment described above or the variation described above. Then, a digest content item can always be included in the opening content item. In other embodiments, the server 1 may set only one of the upper limit for description content items and the upper limit for digest content items.

In other embodiments, the digest content item included in the opening content item may be fixed for each video content item corresponding to the opening content item. That is, the server 1 may set the digest content item to be included in the opening content item in advance for each video content item corresponding to the opening content item. Then, the server 1 may generate an opening content item that includes a description content item that is identified by the method described above and a digest content item that is pre-set for each video content item.

[2-3. Determination of Viewing of Video Content Item]

In the present embodiment, the determination of whether or not a video content item has been viewed is performed by the server 1 based on information from the terminal apparatus 2 that plays the video content item. Specifically, when a video content item is played, the terminal apparatus 2 notifies the server 1 of playback result information indicating a portion that has been played (or "a portion that has been viewed"). The playback result information includes, for example, information that indicates a content item (specifically, the ID) and information that indicates a portion that has been played. The server 1 makes the determination based on the playback result information transmitted from the terminal apparatus 2 and updates the history information according to the determination result. Note that when information indicating the number of times viewed is stored as history information, the server 1 stores, as the number of times viewed, the number of times it has been determined as viewed. Note that in other embodiments, the above determination may be performed by the terminal apparatus 2, and information indicating the determination result (e.g., a notification indicating that the content item has become viewed) may be transmitted from the terminal apparatus 2 to the server 1. At this time, the server 1 updates the history information based on the information transmitted from the terminal apparatus 2.

The determination of whether or not a video content item has been viewed is based on the playback status of the video content item on the terminal apparatus 2. While there is no limitation on the specific determination method, the server 1 may determine that a video content item has been viewed (a) when a predetermined percentage (e.g., 80%) of the entire video content item has been played, or (b) when a particular portion of the video content item has been played. The particular portion described above may be, for example, a portion of the video content item that is important in terms of the contents. The particular portion described above may be, for example, a portion corresponding to the description content item or the digest content item. For example, the user may be instructed to input on the terminal apparatus 2 that the user has completed viewing the video content item so that the server 1 can make the determination described above based on such input.

Also when determining whether or not a description content item has been viewed, as in the case of a video content item, the server 1 may determine that a description content item has been viewed (a) when a predetermined percentage (which may be a different percentage than with a video content item) of the entire description content item has been played, or (b) when a particular portion of the description content item has been played. For example, the user may be instructed to input on the terminal apparatus 2 that the user has completed viewing the description content item so that the server 1 may make the determination described above based on such input.

[3. Specific Examples of Processes on Information Processing System]

Next, referring to FIG. 9 to FIG. 11, specific examples of information processes on the information processing system will be described.

[3-1. Data Used in Information Processes]

Figure 9:
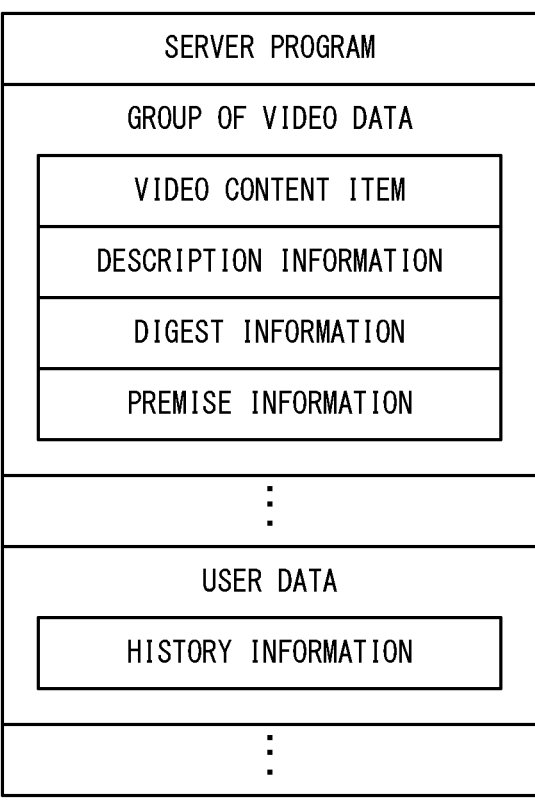
FIG. 9 is a diagram showing an example of data stored in a storage section of a non-limiting server.

FIG. 9 is a diagram showing an example of data stored in the storage section 12 of the server 1. As shown in FIG. 9, the server 1 stores a server program. The server program is a program for controlling the transmission of video content items (and the generation of opening content items), and is a program for executing information processes (i.e., processes shown in FIG. 10 and FIG. 11) executed on the server 1. That is, when the processing section 11 of the server 1 executes the server program, the processes to be described below (see FIG. 10 and FIG. 11) are executed on the server 1.

The server 1 stores data of the group of video data items described above. As described above, the data of the group of video data items includes data of video content items, description content items, digest content items and premise information (see FIG. 4 and FIG. 9).

The server 1 stores user data regarding the user of the terminal apparatus 2. The user data includes data of history information indicating the user's viewing history for video content items. In the present embodiment, the history information includes information that indicates whether or not each video content item has been viewed, and information that indicates the number of times each description content item has been viewed. Note that when a plurality of terminal apparatuses 2 can communicate with the server 1 and a plurality of users use the service by the server 1, the server 1 stores the history information for each user.

Note that in the present embodiment, the data shown in FIG. 9 is stored in the storage section 12 of the server 1. Note however that in other embodiments, some or all of the data may be stored in any storage medium accessible by the server 1. This storage medium is, for example, a data server that is provided separate from the server 1 (it can be said that the storage medium is also a component of the server 1).

Note that the terminal apparatus 2 may store some or all of various data (see FIG. 9) stored in the server 1. The data used in the information processing system may be stored in either one of the server 1 and the terminal apparatus 2. Note that when the same data is stored in the server 1 and in the terminal apparatus 2, the data stored in the server 1 and the data stored in the terminal apparatus 2 are synchronized at appropriate timing.

[3-2. Processes on Server]

Figure 10:
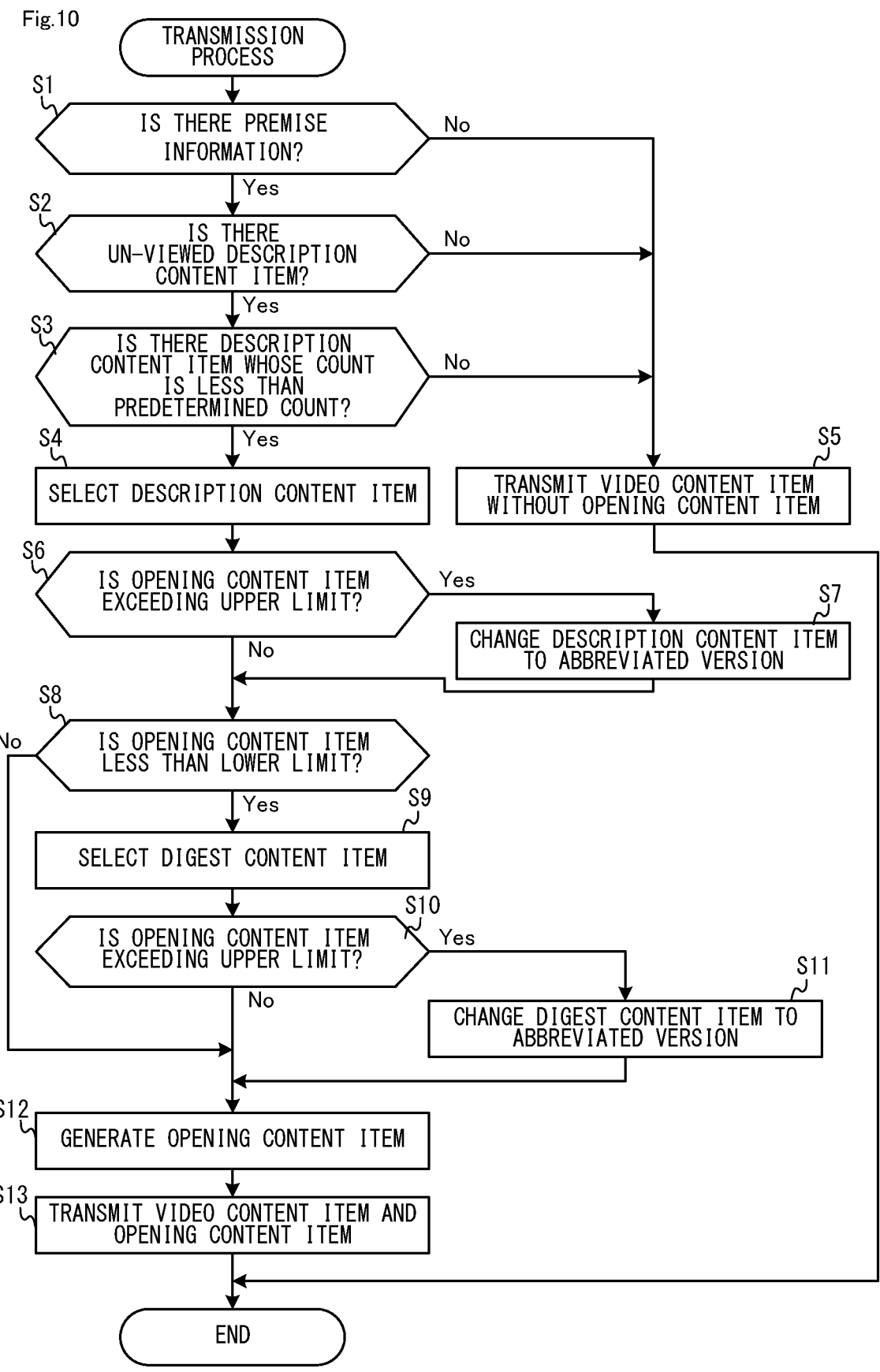
FIG. 10 is a flowchart showing an example of a flow of a transmission process to be executed by a non-limiting server.

FIG. 10 is a flowchart showing an example of a flow of a transmission process to be executed by the server 1. Note that the transmission process shown in FIG. 10 is started when the communication section 13 of the server 1 receives a request from the terminal apparatus 2 to transmit a video content item.

Figure 11:
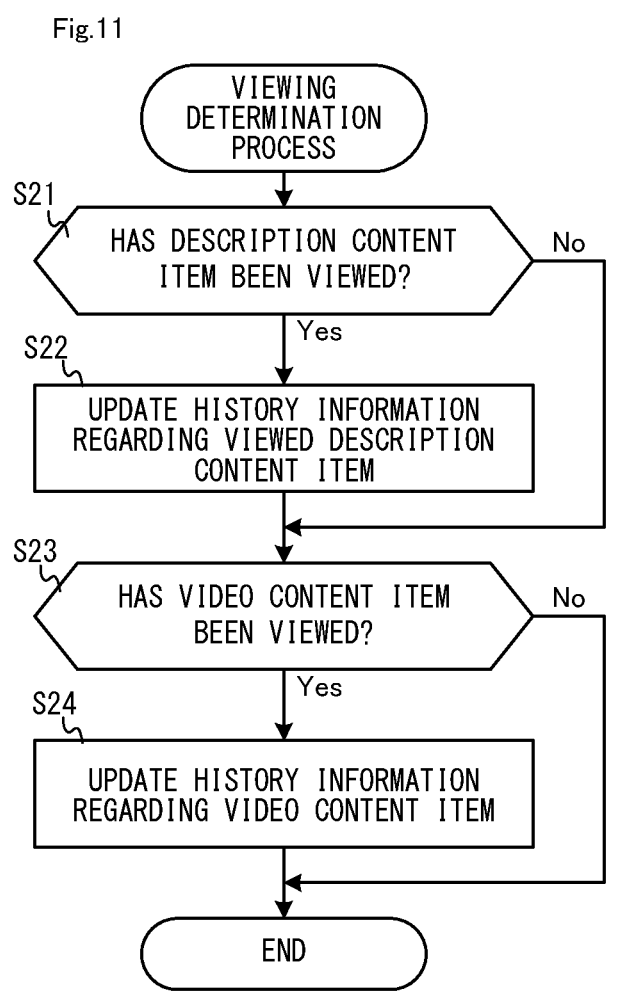

Note that in the present embodiment, the CPU (in other words, the processor) of the processing section 11 of the server 1 executes the processes of various steps shown in FIG. 10 and FIG. 11 by executing the program stored in the storage section 12. Note however that in other embodiments, some of the processes of the steps may be executed by a processor different from the CPU (e.g., a dedicated circuit, etc.). If the terminal apparatus 2 is capable of communicating with the server 1, some of the processes of the steps shown in FIG. 10 and FIG. 11 may be executed in the terminal apparatus 2. The processes of the steps shown in FIG. 10 and FIG. 11 are merely illustrative, and the order of steps to be performed may be switched around or other processes may be executed in addition to (or instead of) the processes of the steps, as long as similar results are obtained.

The processing section 11 of the server 1 executes the processes of the steps shown in FIG. 10 and FIG. 11 using a memory (or the storage section 12). That is, the CPU of the processing section 11 stores data obtained by the processing steps in the memory, and when using the data is used in subsequent processing steps, the data is read from memory and used.

In the transmission process shown in FIG. 10, first, in step S1, the processing section 11 refers to the data of the group of video data items stored in the storage section 12 to determine whether there is premise information that is associated with the specified video content item identified by the request from the terminal apparatus 2. If the determination result from step S1 is affirmative, the process of step S2 is executed. On the other hand, if the determination result from step S1 is negative, the process of step S5 to be described below is executed.

In step S2, the processing section 11 determines whether there is a description content item that is identified by the premise information associated with the specified video content item and that corresponds to an un-viewed video content item. The processing section 11 makes this determination based on the premise information stored in the storage section 12 and the history information regarding the user of the terminal apparatus 2 from which the request is transmitted. If the determination result from step S2 is affirmative, the process of step S3 is executed. On the other hand, if the determination result from step S2 is negative, the process of step S5 to be described below is executed.

In step S3, for one or more description content items identified in step S2 (i.e., description content items identified by premise information associated with the specified video content item and that correspond to un-viewed video content items), the processing section 11 determines whether or not there is a description content item for which the number of times viewed is less than the reference number of times described above. The determination of step S3 is made by referring to the number of times viewed for the description content item identified by the premise information based on the history information stored in the storage section 12 (more specifically, history information regarding the user of the terminal apparatus 2 from which the request is transmitted). If the determination result from step S3 is affirmative, the process of step S4 is executed. On the other hand, if the determination result from step S3 is negative, the process of step S5 to be described below is executed.

In step S4, the processing section 11 selects description content items to be used for the generation of the opening content item (i.e., to be included in the opening content item). Specifically, the processing section 11 selects description content items that are specified by the premise information associated with the specified video content item, that correspond to un-viewed video content items, and for which the number of times viewed is less than the reference number of times described above. In the present embodiment, the processing section 11 stores the data of the selected description content items in the storage section 12. The process of step S6 to be described below is executed, following step S4.

On the other hand, in step S5, the processing section 11 transmits the specified video content item with no opening content item (i.e., without generating the opening content item) to the terminal apparatus 2 using the communication section 13. In this process, the terminal apparatus 2 plays the specified video content item without playing the opening content item. After step S5, the processing section 11 completes the transmission process shown in FIG. 10.

Note that in other embodiments, if any of the determination results from steps S1 to S3 is negative, the processing section 11 may proceed to the process of step S9, instead of the process of step S5. As will be described in detail below, the processes of steps S9 and S12 will generate an opening content item including a digest content item, and the process of step S13 will transmit the opening content item and the specified video content item from the server 1 to the terminal apparatus 2. That is, if there is no description content item to be included in the opening content item, the server 1 may generate the opening content item including a digest content item with no description content item, and transmit the opening content item together with the specified video content item to the terminal apparatus 2.

In step S6, the processing section 11 determines whether the length of the opening content item based on the description content item selected in step S4 exceeds the upper limit. The determination of step S6 may be made by actually generating an opening content item and detecting the length of the opening content item, or by calculating (or "estimating") the length of the opening content item based on the lengths of one or more description content items that have been selected. If the determination result from step S6 is affirmative, the process of step S7 is executed. On the other hand, if the determination result from step S6 is negative, the process of step S8 is executed, skipping the process of step S7.

In step S7, the processing section 11 changes at least a part of the selected description content item to an abbreviated version of the description content item so that the length of the opening content item is less than the upper limit. In the present embodiment, the processing section 11 changes at least a part of the data of the description content item stored in the storage section 12 in step S4 to the data of the abbreviated description content item. The process of step S8 is executed, following step S7.

In step S8, the processing section 11 determines whether the length of the opening content item based on the description content item (i.e., an opening content item generated using a description content item that is selected by the process of step S4 and changed to an abbreviated version by the process of step S7 under certain conditions) is less than the lower limit. As in step S6, the determination in step S8 may be made by actually generating an opening content item and detecting the length of the opening content item, or by calculating (or "estimating") the length of the opening content item based on the length of the description content item and/or the abbreviated description content item to be used for generation. If the determination result from step S8 is affirmative, the process of step S9 is executed. On the other hand, if the determination result from step S8 is negative, the process of step S12 to be described below is executed.

In step S9, the processing section 11 selects digest content items to be used for the generation of the opening content item (i.e., to be included in the opening content item). Specifically, the processing section 11 selects digest content items that correspond to video content items whose sequential numbers are before the specified video content item and that correspond to video content items that have been viewed. In the present embodiment, the processing section 11 stores the data of the selected digest content items in the storage section 12. The process of step S10 is executed, following step S9.

In step S10, the processing section 11 determines whether the length of the opening content item based on the description content item and the digest content item (specifically, the digest content item selected in step S9) exceeds the upper limit. As in steps S6 and S8, the determination in step S10 may be made by actually generating an opening content item and detecting the length of the opening content item, or by calculating (or "estimating") the length of the opening content item based on the lengths of the content items to be used for generation. If the determination result from step S10 is affirmative, the process of step S11 is executed. On the other hand, if the determination result from step S10 is negative, the process of step S12 to be described below is executed.

In step S11, the processing section 11 changes at least a part of the selected digest content item to an abbreviated digest content item so that the length of the opening content item is less than the upper limit. In the present embodiment, the processing section 11 changes at least a part of the data of the digest content item stored in the storage section 12 in step S9 to the data of the abbreviated digest content item. The process of step S12 is executed, following step S11.

In step S12, the processing section 11 generates an opening item content. Specifically, the processing section 11 generates an opening content item based on content items stored in the storage section 12 by the processes of steps S4, S7, S9 and S11 (specifically, a description content item, an abbreviated description content item, a digest content item and/or an abbreviated digest content item). The process of step S13 is executed, following step S12.

In step S13, the processing section 11 transmits the specified video content item and the opening content item generated in step S12 to the terminal apparatus 2 using the communication section 13. As described above, the processing section 11 transmits the specified video content item and the opening content item to the terminal apparatus 2 by such a method that the opening content item is output before the specified video content item on the terminal apparatus 2. After step S13, the processing section 11 ends the transmission process shown in FIG. 10.

Note that in other embodiments, where a description content item and a digest content item to be used for an opening content item are determined based on priority (see FIG. 8), following the process of step S4, the processing section 11 executes the process of selecting a description content item and a digest content item based on priority and generating an opening content item so as to include the selected content items, instead of the processes of steps S6 to S12. Specifically, the processing section 11 selects one or more description content items and/or digest content items from among description content items that are selected in step S4 and digest content items that correspond to video content items whose sequential numbers are before the specified video content item in the order of priority and so that the length of the opening content item does not exceed the upper limit. Then, the processing section 11 generates an opening content item including the selected content items. Thus, it is possible to generate an opening content item so as to include content items that are determined based on priority.

As described above, a video content item that is requested by the terminal apparatus 2 and an opening content item that corresponds to the video content item are transmitted from the server 1 to the terminal apparatus 2. The opening content item is played and the video content item is played on the terminal apparatus 2. When these content items are played, the terminal apparatus 2 transmits the playback result information described above to the server 1. Note that the terminal apparatus 2 may transmit the playback result information to the server 1 at appropriate timing. For example, the terminal apparatus 2 may repeatedly transmit the playback result information, which represents the playback result for a predetermined period of time, to the server 1 at an interval of the period of time during playback of the content items, or the terminal apparatus 2 may transmit, in response to the completion of a single playback on the terminal apparatus 2, the playback result information, which represents the playback result during the playback, to the server 1. The server 1 executes the viewing determination process to be described below based on the playback result information.

FIG. 11 is a flowchart showing an example of a flow of a viewing determination process to be executed by the server 1. Note that the viewing determination process shown in FIG. 10 is initiated in response to the server 1 receiving the playback result information from the terminal apparatus 2.

In step S21, the processing section 11 determines whether a description content item included in an opening content item has been viewed on the terminal apparatus 2. The determination of step S21 is made according to the method described in "[2-3. Determination of viewing of video content item]" above, based on the playback result information received from the terminal apparatus 2 using the communication section 13. Note that where the playback result information is repeatedly transmitted at an interval of the predetermined period of time during a single playback of an opening content item on the terminal apparatus 2, the processing section 11 performs the above determination based on a plurality of playback result information received.

If the determination result from step S21 is affirmative, the process of step S22 is executed. On the other hand, if the determination result from step S21 is negative, the process of step S23 to be described below is executed, skipping the process of step S22.

In step S22, the processing section 11 updates the history information stored in the storage section 12 for the description content item that is determined to have been viewed in step S21. Specifically, the processing section 11 updates the history information so that the number of times the description content item has been viewed is incremented by 1. The process of step S23 is executed, following step S22.

In step S23, the processing section 11 determines whether a video content item has been viewed on the terminal apparatus 2. The determination of step S23 is made according to the method described in "[2-3. Determination of viewing of video content item]" above based on the playback result information received from the terminal apparatus 2 using the communication section 13. Note that where the playback result information is repeatedly transmitted at an interval of the predetermined period of time during a single playback of a video content item on the terminal apparatus 2, the processing section 11 makes the determination described above based on a plurality of playback result information received. If the determination result from step S23 is affirmative, the process of step S24 is executed. On the other hand, if the determination result from step S23 is negative, the processing section 11 ends the viewing determination process shown in FIG. 11.

In step S24, the processing section 11 updates the history information stored in the storage section 12 for a video content item that is determined to have been viewed in step S23. Specifically, the processing section 11 updates the history information so as to indicate that the video content item has been viewed. After step S24, the processing section 11 ends the viewing determination process shown in FIG. 11.

[4. Functions/Effects of Present Embodiment and Variations]

As described above, in the embodiment described above, the server 1 is used to transmit video content items to the terminal apparatus 2 used by the user. A storage medium (or "storage device") accessible by the server 1 stores the following information:

a plurality of video content items that are assigned sequential numbers;

premise information, which is information that is associated with at least one video content item from among a plurality of video content items and is information related to another video content item other than the at least one video content item; and history information that indicates viewing history of a user for the plurality of video content items.

The server 1 performs the following processes:

receiving, from the terminal apparatus 2, information that indicates a specified video content item that is specified by the user from among the plurality of video content items (FIG. 10);

based on premise information associated with the specified video content item and the history information of the user, generating an additional content item (e.g., an opening content item) that describes the other video content item corresponding to the premise information (step S12); and transmitting the specified video content item and the additional content item to the terminal apparatus 2 (step S13).

Then, an additional content item describing the contents of another video content item other than the specified video content item is transmitted to the terminal apparatus 2 in addition to the specified video content item. Thus, it is easier for the user to understand the specified video content item by viewing the additional content item. Then, since an additional content item is generated based on the history information, it is possible to generate an additional content item based on the viewing history of the user. For example, it is possible to generate an additional content item related to a video content item that has not been viewed by the user.

The "storage medium accessible by the server 1" means that it may be a storage medium provided in the server 1, a storage medium provided separately from the server 1, or a combination of those storage media. That is, video content items, premise information and history information may be stored in a storage medium provided in the server 1 or stored in a storage medium provided separately from the server 1, or a part of video content items, premise information and history information may be stored in a storage medium provided in the server 1, with the remainder stored in a storage medium provided separately from the server 1.

Note that although the opening content item includes a video content item in the embodiment described above, the opening content item may be information that is output in any form in other embodiments. For example, in other embodiments, the opening content item may be a text-only content item or a content item consisting of text and audio. Note that where the opening content item includes a text content item, the text content item may be displayed together with video (e.g., subtitles) or may be displayed separately from video (e.g., still images) on the terminal apparatus 2.

In the embodiment described above, the data of the group of video data items is stored on the server side, with opening content items generated on the server side. In other embodiments, the data of the group of video data items may be stored on the terminal apparatus 2 with opening content items generated on the terminal apparatus 2. That is, in other embodiments, functions of the server 1 in the embodiment described above may be implemented by the terminal apparatus 2. In this case, the terminal apparatus 2 does not need to be communicatively connected to the server 1.

Note that in the embodiment described above, where a process is executed using data (which is meant to include programs) on an information processing apparatus, a part of data necessary for the process may be transmitted from another information processing apparatus that is different from the information processing apparatus. In this case, the first information processing apparatus may execute the process using data received from the second information processing apparatus and data stored in the first information processing apparatus.

Note that in other embodiments, the information processing system does not need to include some of the components of the embodiment described above and does not need to execute some of the processes that are executed in the embodiment described above. For example, in order to realize a specific one of the advantageous effects of the embodiment described above, the information processing system may include a component or components for realizing the specific advantageous effect and execute a process or processes for realizing the specific advantageous effect, and the information processing system does not need to include other components and does not need to execute other processes.

The embodiment described above can be used as, for example, an information processing system or a server, with the aim of making it easier for the user to understand a video content item, for example.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A server for transmitting a video content item to a terminal used by a user, wherein:
   a storage medium accessible by the server is configured to:
      store a plurality of video content items that are assigned sequential numbers;
      store premise information, which is information that is associated with at least one video content item from among the plurality of video content items and is information related to another video content item of the plurality of video content items other than the at least one video content item; and
      store history information that indicates viewing history of the user for the plurality of video content items; and
   the server includes a processor and a memory coupled thereto, the processor being configured to control the server to at least:
      receive, from the terminal, information that indicates a specified video content item that is specified by the user from among the plurality of video content items;
      based on the premise information associated with the specified video content item and the history information of the user, generate an additional content item that describes the other video content item corresponding to the premise information; and
      transmit the specified video content item and the additional content item to the terminal.

2. The server according to claim 1, wherein the specified video content item and the additional content item are transmitted to the terminal so that the additional content item is output before the specified video content item on the terminal.

3. The server according to claim 1, wherein the premise information associated with the video content item is information related to the other video content item whose sequential number is before the video content item from among the plurality of video content items.

4. The server according to claim 1, wherein if the history information indicates that the other video content item corresponding to the premise information associated with the specified video content item is un-viewed, the additional content item is generated so as to include contents of a part of the other video content item corresponding to the premise information.

5. The server according to claim 1, wherein:
   the premise information is information with which it is possible to identify a description content item that describes the other video content item; and
   the additional content item includes a description content item that is identified by the premise information associated with the specified video content item and that is related to the video content item indicated as being un-viewed in the history information.

6. The server according to claim 5, wherein:

the history information further indicates a viewing history of the user for the description content item;

when the user views the additional content item, the history information is updated so as to indicate that the description content item included in the additional content item has been viewed; and if the history information indicates that the description content item identified by the premise information associated with the specified video content item has been viewed for a number of times that is equal to or greater than a predetermined number of times, the additional content item is generated without including the description content item.

7. The server according to claim 5, wherein:

an upper limit is set for a length of the additional content item; and if a total length of one or more description content items that are identified by the premise information associated with the specified video content item and that are related to video content items indicated as un-viewed in the history information exceeds the upper limit, the additional content item is generated using an abbreviated version of a description content item for at least some of the one or more description content items so that the total length is less than or equal to the upper limit.

8. The server according to claim 5, wherein:

an upper limit is set for a length of the additional content item;

priorities are set for the description content items; and if a total length of one or more description content items that are identified by the premise information associated with the specified video content item and that correspond to video content items that are indicated as un-viewed in the history information exceeds the upper limit, the description content item to be included in the additional content item is determined based on the priorities set for the one or more description content items so that the total length is less than or equal to the upper limit.

9. The server according to claim 1, wherein:

the storage medium stores digest information indicating a digest version content item of a video content item for each of the plurality of video content items; and the additional content item including the digest version content item is generated based further on the digest information corresponding to other video content items whose sequential numbers are before the specified video content item from among the plurality of video content items.

10. The server according to claim 9, wherein:

priorities are set for the digest version content items; and the digest version content item to be included in the additional content item is determined based on the priorities set for the digest version content items.

11. The server according to claim 9, wherein the additional content item is generated (a) without including the digest version content items that correspond to video content items indicated as un-viewed in the history information, or (b) without including digest version content items that correspond to video content items indicated as un-viewed in the history information and that are indicated by the digest information to which predetermined specification information is attached.

12. The server according to claim 9, wherein:

an upper limit is set for a length of the additional content item; and if a length of the additional content item including one or more digest version content items selected based on a predetermined criterion from among digest version content items corresponding to the plurality of video content items exceeds the upper limit, the additional content item is generated using an abbreviated version of a content item for at least one of the one or more digest version content items so that the length is less than or equal to the upper limit.

13. The server according to claim 9, wherein:

a lower limit is set for a length of the additional content item; and if a length of the additional content item based on the premise information associated with the specified video content item and the history information is less than the lower limit, the additional content item including the digest version content item is generated so that the length is equal to or greater than the lower limit.

14. The server according to claim 1, wherein when the specified video content item is a video content item whose sequential number is first, the specified video content item is transmitted to the terminal without generating the additional content item.

15. An information processing system for transmitting a video content item to a terminal used by a user, wherein:

a storage medium accessible by the information processing system is configured to:

store a plurality of video content items that are assigned sequential numbers;

store premise information, which is information that is associated with at least one video content item from among the plurality of video content items and is information related to another video content item of the plurality of video content items other than the at least one video content item; and store history information that indicates viewing history of the user for the plurality of video content items; and the information processing system includes a processor and a memory coupled thereto, the processor being configured to control the information processing system to at least:

receive, from the terminal, information that indicates a specified video content item that is specified by the user from among the plurality of video content items;

based on the premise information associated with the specified video content item and the history information of the user, generate an additional content item that describes the other video content item corresponding to the premise information; and transmit the specified video content item and the additional content item to the terminal.

16. The information processing system according to claim 15, wherein if the history information indicates that the other video content item corresponding to the premise information associated with the specified video content item is un-viewed, the additional content item is generated so as to include contents of a part of the other video content item corresponding to the premise information.

17. The information processing system according to claim 15, wherein:

the premise information is information with which it is possible to identify a description content item that describes the other video content item; and the additional content item includes a description content item that is identified by the premise information associated with the specified video content item and that is related to the video content item indicated as being un-viewed in the history information.

18. The information processing system according to claim 17, wherein:

the history information further indicates a viewing history of the user for the description content item;

when the user views the additional content item, the history information is updated so as to indicate that the description content item included in the additional content item has been viewed; and if the history information indicates that the description content item identified by the premise information associated with the specified video content item has been viewed for a number of times that is equal to or greater than a predetermined number of times, the additional content item is generated without including the description content item.

19. A non-transitory computer-readable storage medium storing therein an information processing program to be executed by a processor of a server for transmitting video content items to a terminal used by a user, wherein:

a storage device accessible by the server is configured to:

store a plurality of video content items that are assigned sequential numbers;

store premise information, which is information that is associated with at least one video content item from among the plurality of video content items and is information related to another video content item of the plurality of video content items other than the at least one video content item; and store history information that indicates viewing history of the user for the plurality of video content items; and the storage medium stores instructions that, when executed by the processor, causes the server to perform operations including:

obtaining, from the terminal, information that indicates a specified video content item that is specified by the user from among the plurality of video content items;

based on the premise information associated with the specified video content item and the history information of the user, generating an additional content item that describes the other video content item corresponding to the premise information; and transmitting the specified video content item and the additional content item to the terminal.

20. A transmission method to be executed on a server for transmitting video content items to a terminal used by a user, wherein:

a storage medium accessible by the server is configured to:

store a plurality of video content items that are assigned sequential numbers;

store premise information, which is information that is associated with at least one video content item from among the plurality of video content items and is information related to another video content item of the plurality of video content items other than the at least one video content item; and store history information that indicates viewing history of the user for the plurality of video content items; and the server is configured to:

receive, from the terminal, information that indicates a specified video content item that is specified by the user from among the plurality of video content items;

based on the premise information associated with the specified video content item and the history information of the user, generate an additional content item that describes the other video content item corresponding to the premise information; and transmit the specified video content item and the additional content item to the terminal.

* * * * *